US012458894B2

(12) United States Patent
Tinari et al.

(10) Patent No.: US 12,458,894 B2
(45) Date of Patent: Nov. 4, 2025

(54) STORAGE MEDIUM, GAME SYSTEM AND GAME CONTROL METHOD

(71) Applicant: NINTENDO CO., LTD., Kyoto (JP)

(72) Inventors: Abebe Tinari, Osaka (JP); Yongmin Park, Osaka (JP)

(73) Assignee: Nintendo Co., Ltd., Kyoto (JP)

( * ) Notice: Subject to any disclaimer, the term of this patent is extended or adjusted under 35 U.S.C. 154(b) by 235 days.

(21) Appl. No.: 18/486,896

(22) Filed: Oct. 13, 2023

(65) Prior Publication Data

US 2024/0123359 A1 Apr. 18, 2024

(30) Foreign Application Priority Data

Oct. 18, 2022 (JP) ................................ 2022-166645

(51) Int. Cl.
*A63F 13/92* (2014.01)
*A63F 13/2145* (2014.01)
*A63F 13/24* (2014.01)
*A63F 13/31* (2014.01)

(52) U.S. Cl.
CPC .......... *A63F 13/92* (2014.09); *A63F 13/2145* (2014.09); *A63F 13/24* (2014.09); *A63F 13/31* (2014.09)

(58) Field of Classification Search
None
See application file for complete search history.

(56) References Cited

U.S. PATENT DOCUMENTS

| | | | | |
|---|---|---|---|---|
| 6,743,099 | B2 | 6/2004 | Yabe et al. | |
| 7,594,847 | B1 * | 9/2009 | York | A63F 13/48 463/2 |
| 9,519,987 | B1 * | 12/2016 | Kharkar | G06T 13/40 |
| 11,278,795 | B2 | 3/2022 | Taura et al. | |
| 2002/0119811 | A1 * | 8/2002 | Yabe | A63F 13/45 463/8 |
| 2006/0116186 | A1 * | 6/2006 | Sawada | C04B 37/028 463/8 |
| 2020/0254335 | A1 * | 8/2020 | Taura | A63F 13/58 |
| 2020/0384363 | A1 * | 12/2020 | Kyogoku | A63F 13/525 |
| 2022/0152481 | A1 * | 5/2022 | Taura | A63F 13/23 |

FOREIGN PATENT DOCUMENTS

| | | | |
|---|---|---|---|
| JP | 2001190833 | A | 7/2001 |
| JP | 2002224435 | A | 8/2002 |
| JP | 2003047767 | A | 2/2003 |
| JP | 2020130213 | A | 8/2020 |

* cited by examiner

*Primary Examiner* — Tramar Harper
(74) *Attorney, Agent, or Firm* — Nixon & Vanderhye PC

(57) ABSTRACT

A non-limiting example game system comprises a main body apparatus, and the main body apparatus executes a virtual game and a game screen is displayed on a display device. A player character, a first fellow character and a background object are displayed in the game screen. The player character and the first fellow character are moved individually by respective operations of two analog sticks by a player. If the player character and second fellow character are combined with each other, the second fellow character is moved along with the player character by an operation of the analog stick by the player.

20 Claims, 27 Drawing Sheets

ANOTHER EXAMPLE OF COMBINED STATE

FURTHER EXAMPLE OF COMBINED STATE

STORAGE MEDIUM, GAME SYSTEM AND GAME CONTROL METHOD

CROSS REFERENCE OF RELATED APPLICATION

This application claims a priority to Japanese Patent Application No. 2022-166645 filed on Oct. 18, 2022, and the entire contents of which are incorporated herein by reference.

FIELD

This application describes a storage medium, a game system and a game control method, in which a player moves two player characters in a virtual space to advance a virtual game.

SUMMARY

It is a primary object of an embodiment(s) to provide a novel storage medium, game system and game control method.

Moreover, it is another object of the embodiment(s) to provide a storage medium, game system and game control method, capable of playing a new rhythm game according to intuition using an operation device that a tilting operation or sliding operation can be performed.

A first embodiment is a non-transitory computer-readable storage medium having stored with a game program executable by an information processing apparatus comprising one or more processors, wherein the information processing apparatus is communicable with an operation device having a plurality of operation portions including a one-side direction input portion provided on a one-side holding portion that is held by one hand of a player, an other-side direction input portion provided on an other-side holding portion that is held by another hand of the player, a first one-side operation portion provided on the one-side holding portion and a first other-side operation portion provided on the other-side holding portion, wherein the game program causes the one or more processors to execute: acquiring operation data that indicates an operation with respect to the plurality of operation portions; during a time of a first mode, controlling a movement of a first player character in a virtual space according to an operation direction of the one-side direction input portion indicated by the operation data and controlling a movement of a second player character in the virtual space according to an operation direction of the other-side direction input portion; during a time of a second mode, controlling at least the movement of the first player character in the virtual space based on the operation direction of the one-side direction input portion indicated by the operation data; changing to the second mode from the first mode according to an operation of the first one-side operation portion indicated by the operation data; making the second player character disappear from its position in the first mode when changing to the second mode; changing to the first mode from the second mode according to an operation of the first other-side operation portion indicated by the operation data; and arranging the second player character at a position based on a position of the first player character when changing to the first mode.

According to the first embodiment, since a player can freely change as necessary between the first mode that two player characters are operated individually by the one-side direction input portion and the other-side direction input portion and the second mode that the two player characters are controlled by only the one-side direction input portion, as compared with a case where two player characters are always moved individually by the one-side operation portion and the other-side operation portion, it is possible to suppress a sense of burden of the player. Moreover, according to the first embodiment, since the first one-side operation portion that is provided on the operation device having the one-side direction input portion that bears a movement operation in the second mode functions as a control portion of a change operation to the second from the first mode, the player can perform the changing operation with the one hand and then use the same one-side direction input portion to perform the movement operation, and therefore, there is little possibility that the player is confused in the operation. Inversely, when shifting to the first mode from the second mode, the movement operation of the second player character is performed by the other-side direction input portion, and the first other-side operation portion of the operation device on the same other-side bears the function of the change operation to the first mode, and therefore, similarly, confusion is not caused in changing the mode and subsequent operations.

A second embodiment is the storage medium according to the first embodiment, wherein the game program causes the one or more processors to execute: determining whether a distance between characters that is a distance between first player character and the second player character in the virtual space exceeds a predetermined distance; and determining that a virtual game is in failure when the distance between characters exceeds the predetermined distance.

According to the second embodiment, it is possible to provide an interesting virtual game that the first player character and the second player character are not separated from each other too much.

A third embodiment is the storage medium according to the second embodiment, wherein the game program causes the one or more processors to execute: determining that the virtual game is in failure when a time period that the distance between characters exceeds the predetermined distance is continued for a predetermined time period; and shortening the predetermined time period in a case where at least one of the first player character and the second player character is moved in a direction that the distance between characters becomes longer in a state that the distance between characters exceeds the predetermined distance in comparison with a case where at least one of the first player character and the second player character is not moved in the direction that the distance between characters becomes longer.

According to the third embodiment, since the game over is not determined immediately even if the distance between characters exceeds the predetermined distance, by giving the player a certain amount of grace, but shortening the predetermined time period when the distance between characters is still longer, it is possible to provide a more interesting virtual game.

A fourth embodiment is the storage medium according to the first embodiment, wherein the game program causes the one or more processors to execute: combining the second player character with the first player character when changing to the second mode from the first mode; and performing, according to an operation of the other-side direction input portion, a predetermined action having an effect toward a direction that the other-side direction input portion from the position based on the position of the first player character is operated.

A fifth embodiment is the storage medium according to the fourth embodiment, wherein the game program causes the one or more processors to execute: performing continuously the predetermined action while the other-side direction input portion is continued to be operated.

A sixth embodiment is the storage medium according to the fourth embodiment, wherein the other-side direction input portion of the operation device includes a stick or a slide pad, wherein the game program causes the one or more processors to execute: performing, irrespective of an amount that the other-side direction input portion is tilted or slid, the predetermined action in a position away from the first player character by a predetermined length or between the first player character and the position away from the first player character.

A seventh embodiment is the storage medium according to the fourth embodiment, wherein the game program causes the one or more processors to execute: combining the second player character with the first player character when changing to the second mode from the first mode; and elongating the second player character in a direction that the other-side direction input portion is operated from the first player character according to an operation of the other-side direction input portion.

According to the seventh embodiment, when changing to the second mode from the first mode, the control of movement of the second player character is changed from the other-side direction input portion to the one-side direction input portion, but an operation relating the second player character can be continuously performed using the other-side direction input portion, and therefore, the player can operate the other-side direction input portion intuitively.

An eighth embodiment is the storage medium according to the sixth embodiment, wherein the game program causes the one or more processors to execute: deforming and combining the second player character with the first player character when changing to the second mode from the first mode.

According to the eighth embodiment, it is easy to understand whether the current mode is the first mode or the second mode just by looking at the player characters.

A ninth embodiment is the storage medium according to the first embodiment, wherein the plurality of operation portions include a second one-side operation portion that is provided on the one-side holding portion and different from the first one-side operation portion and a second other-side operation portion that is provided on the other-side holding portion and different from the first other-side operation portion, wherein the game program causes the one or more processors to execute: making, according to an operation of the second one-side operation portion, the first player character perform an action to stop a movement of an enemy character; and making, according to an operation of the second other-side operation portion, the second player character perform an action to attack the enemy character.

According to the ninth embodiment, by making actions that the first player character and the second player character can perform actions having different effects against the enemy character, it is possible to provide with interest of simultaneously controlling two player characters having different roles. Moreover, there is an occasion that it is difficult to defeat the enemy character while operating two player characters individually by the one-side direction input portion and the other-side direction input portion in a situation that the enemy character that moves exists, by providing to one of the player characters an effect stopping the movement of the enemy character and by providing to the other of the player characters an affect attacking the enemy character, it becomes possible to approach and attack the enemy character easily, and therefore, if operating both the player characters well, it is possible to more easily defeat the enemy character, and thus, interest is increased.

A tenth embodiment is the storage medium according to the ninth embodiment, wherein the game program causes the one or more processors to execute: making, according to an operation of the second one-side operation portion, the first player character perform the action to stop a movement of the enemy character when the enemy character exists within a first effective range that is set based on the position of the first player character; and making, according to an operation of the second other-side operation portion, the second player character perform the action to attack the enemy character when the enemy character exists within a second effective range that is set based on the position of the second player character, the first effective range being wider that the second effective range.

According to the tenth embodiment, by making a size of the effective range for an action stopping the movement of the enemy character larger than a size of the effective range for action attacking the enemy character, even players who are not good at attacking the enemy character directly, it is easy to play the game because they can attack the enemy character after having stopped once the movement thereof.

An eleventh embodiment is the storage medium according to the ninth embodiment, wherein the game program causes the one or more processors to execute: moving an effective range that is set based on a position of the first player character toward a position of the enemy character when performing the action to stop a movement of the enemy character; and making, according to an operation of the second one-side operation portion, the first player character perform the action to stop the movement of the enemy character when the enemy character exists within the effective range.

It is difficult to target the enemy character with one hand in the virtual game that the enemy character is targeted with one hand; however, according to the eleventh embodiment, since by assisting the action facing toward the direction of the enemy character, an operation comfortable for the player is realized.

A twelfth embodiment is the storage medium according to the first embodiment, wherein the plurality of operation portions include a second one-side operation portion that is different from the first one-side operation portion and provided on a surface different from a surface on which the one-side operation portion is provided, and a second other-side operation portion that is different from the first other-side operation portion and provided on a surface different from a surface on which the other-side operation portion is provided, wherein the game program causes the one or more processors to execute: further controlling a direction of the first player character based on an operation direction of the one-side direction input portion and a direction of the second player character based on an operation direction of the other-side direction input portion; performing a first action having an effect in a direction that the first player character faces according to an operation of the second one-side operation portion; and performing a second action having an effect in a direction that the second player character faces according to an operation of the second other-side operation portion.

According to the twelfth embodiment, by operating the operation portion provided on a surface that is different from the direction input portion that controls the direction, the action according to the direction of the player character is performed, and therefore, it is possible to easily perform the action while controlling the direction.

A thirteenth embodiment is the storage medium according to the twelfth embodiment, wherein the game program causes the one or more processors to execute: performing, when the second other-side operation portion is operated, a third action that has an effect in a direction according to an operation direction of the other-side direction input portion, the third action being different from the first action and the second action.

According to the thirteenth embodiment, by operating the operation portion provided on a surface that is different from the direction input portion that controls the direction, the action according to the operation direction of the other-side direction input portion is performed, it is possible to easily perform the action while controlling the direction.

A fourteenth embodiment is the storage medium according to the twelfth embodiment, wherein the plurality of operation portions include a third one-side operation portion provided on a surface of the one-side holding portion that is the same as a surface on which the one-side direction input portion is provided, and a third other-side operation portion provided on a surface of the other-side holding portion that is the same as a surface on which the other-side direction input portion is provided, wherein the game program causes the one or more processors to execute: performing, when the third one-side operation portion is operated, a fourth action having an effect that is irrespective of a direction that the first player character faces; and performing, when the third other-side operation portion is operated, a fifth action having an effect that is irrespective of a direction that the second player character faces.

A fifteenth embodiment is the storage medium according to the fourteenth embodiment, wherein the game program causes the one or more processors to execute: exerting a predetermined effect in the direction that the second player character faces when one of the third one-side operation portion and the third other-side operation portion is operated during the second action is being performed.

A sixteenth embodiment is the storage medium according to the twelfth embodiment, wherein the first one-side operation portion is provided on a surface different from a surface on which the one-side direction input portion is provided, and the first other-side operation portion is provided on a surface different from a surface on which the other-side direction input portion is provided.

According to the sixteenth embodiment, it is possible to change between the first mode and the second mode even while making the two player characters move, respectively, and thus, it is possible to advance the virtual game smoothly.

A seventeenth embodiment is the storage medium according to the sixteenth embodiment, wherein the game program causes the one or more processors to execute: making the second player character, according to an operation of the first other-side operation portion, perform a fourth action that is different from the second action and has an effect on a direction that one of the first player character and the second player character faces.

According to the seventeenth embodiment, by using the first other-side operation portion for changing to the first mode from the second mode in order to perform an attack in the first mode, it is possible to make the player have strongly the consciousness that the other-side holding portion of the operation device is an operation portion for controlling the second player character.

An eighteenth embodiment is a game system comprising an information processing apparatus having one or more processors, wherein the information processing apparatus is communicable with an operation device having a plurality of operation portions including a one-side direction input portion provided on a one-side holding portion that is held by one hand of a player, an other-side direction input portion provided on an other-side holding portion that is held by another hand of the player, a first one-side operation portion provided on the one-side holding portion and a first other-side operation portion provided on the other-side holding portion, wherein the game program causes the one or more processors to execute: acquiring operation data that indicates an operation with respect to the plurality of operation portions; during a time of a first mode, controlling a movement of a first player character in a virtual space according to an operation direction of the one-side direction input portion indicated by the operation data and controlling a movement of a second player character in the virtual space according to an operation direction of the other-side direction input portion; during a time of a second mode, controlling at least the movement of the first player character in the virtual space based on the operation direction of the one-side direction input portion indicated by the operation data; changing to the second mode from the first mode according to an operation of the first one-side operation portion indicated by the operation data; making the second player character disappear from its position in the first mode when changing to the second mode; changing to the first mode from the second mode according to an operation of the first other-side operation portion indicated by the operation data; and arranging the second player character at a position based on a position of the first player character when changing to the first mode.

A nineteenth embodiment is a game control method of an information processing apparatus comprising one or more processers, wherein the information processing apparatus is communicable with an operation device having a plurality of operation portions including a one-side direction input portion provided on a one-side holding portion that is held by one hand of a player, an other-side direction input portion provided on an other-side holding portion that is held by another hand of the player, a first one-side operation portion provided on the one-side holding portion and a first other-side operation portion provided on the other-side holding portion, wherein the game control method comprising: acquiring operation data that indicates an operation with respect to the plurality of operation portions; during a time of a first mode, controlling a movement of a first player character in a virtual space according to an operation direction of the one-side direction input portion indicated by the operation data and controlling a movement of a second player character in the virtual space according to an operation direction of the other-side direction input portion; during a time of a second mode, controlling at least the movement of the first player character in the virtual space based on the operation direction of the one-side direction input portion indicated by the operation data; changing to the second mode from the first mode according to an operation of the first one-side operation portion indicated by the operation data; making the second player character disappear from its position in the first mode when changing to the second mode; changing to the first mode from the second mode according to an operation of the first other-side operation portion indicated by the operation data; and arranging the second player character at a position based on a position of the first player character when changing to the first mode.

According also to each of the eighteenth embodiment and the nineteenth embodiment, similar to the first embodiment, it is possible to suppress a sense of burden of the player as compared with a case where two player characters are always moved individually by the one-side operation portion and the other-side operation portion.

The above-described objects and other objects, features, aspects and advantages of the embodiment(s) will become more apparent from the following detailed description when taken in conjunction with the accompanying drawings.

DETAILED DESCRIPTION OF NON-LIMITING EXAMPLE EMBODIMENTS

A non-limiting example game system according to an exemplary embodiment will be described in the following. The non-limiting example game system 1 according to the embodiment comprises a main body apparatus (an information processing apparatus that functions as a game apparatus main body in the embodiment) 2, a left controller 3 and a right controller 4. The left controller 3 and the right controller 4 are attachable to or detachable from the main body apparatus 2, respectively. That is, the game system 1 can be used as a unified apparatus formed by attaching each of the left controller 3 and the right controller 4 to the main body apparatus 2. Moreover, in the game system 1, the main body apparatus 2, the left controller 3 and the right controller 4 can also be used as separate bodies (see FIG. 2). In the following, the hardware structure of the game system 1 according to the embodiment will be described, and then, the control of the game system 1 of the embodiment will be described.

Figure 1:
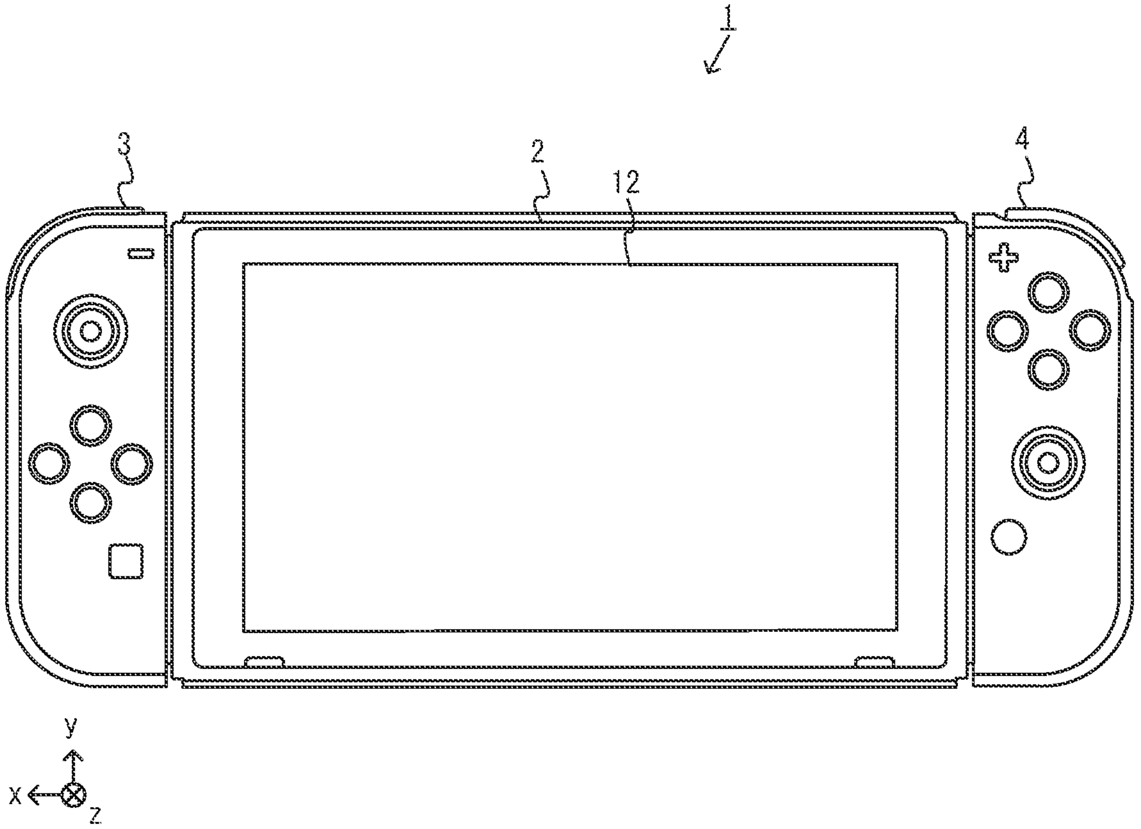
FIG. 1 is an illustration view showing a non-limiting example state wherein a left controller and a right controller are attached to a main body apparatus of this embodiment.

FIG. 1 is an illustration view showing an example of a state where the left controller 3 and the right controller 4 are attached to the main body apparatus 2. As shown in FIG. 1, the left controller 3 and the right controller 4 is respectively attached to the main body apparatus 2, thereby to be unified it. The main body apparatus 2 is an apparatus for performing various processing (game processing, for example) in the game system 1. The main body apparatus 2 comprises a display 12. Each of the left controller 3 and the right controller 4 is a device comprising an operation section with which a user provides inputs.

Figure 2:
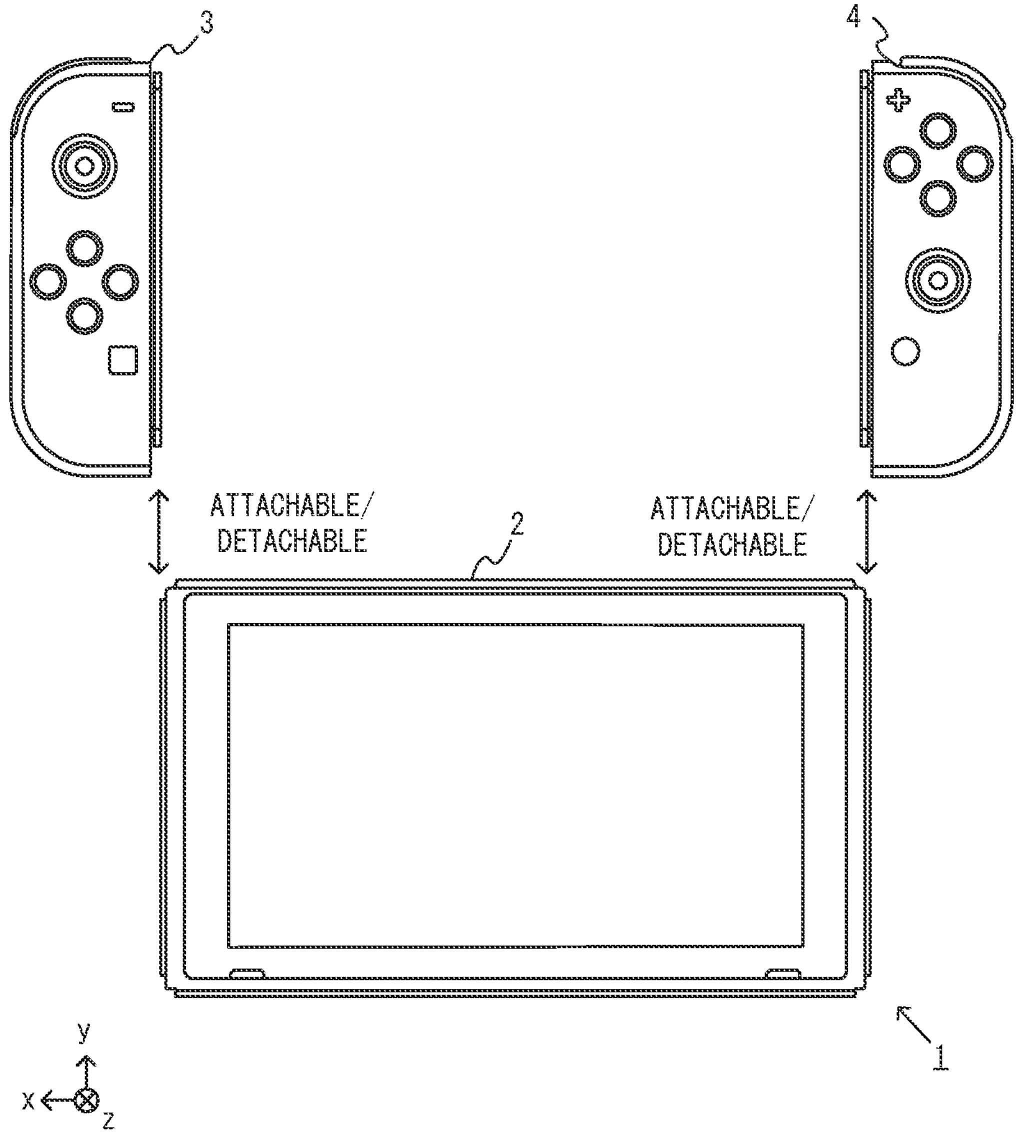
FIG. 2 is an illustration view showing a non-limiting example state where the left controller and the right controller are detached from the main body apparatus, respectively.

FIG. 2 is an illustration view showing an example of a state where the left controller 3 and the right controller 4 are detached from the main body apparatus 2, respectively. As shown in FIG. 1 and FIG. 2, each of the left controller 3 and the right controller 4 is attachable to and detachable from the main body apparatus 2. In addition, it should be noted that the left controller 3 and the right controller 4 may be referred to collectively as a "controller" in the following.

Figure 3:
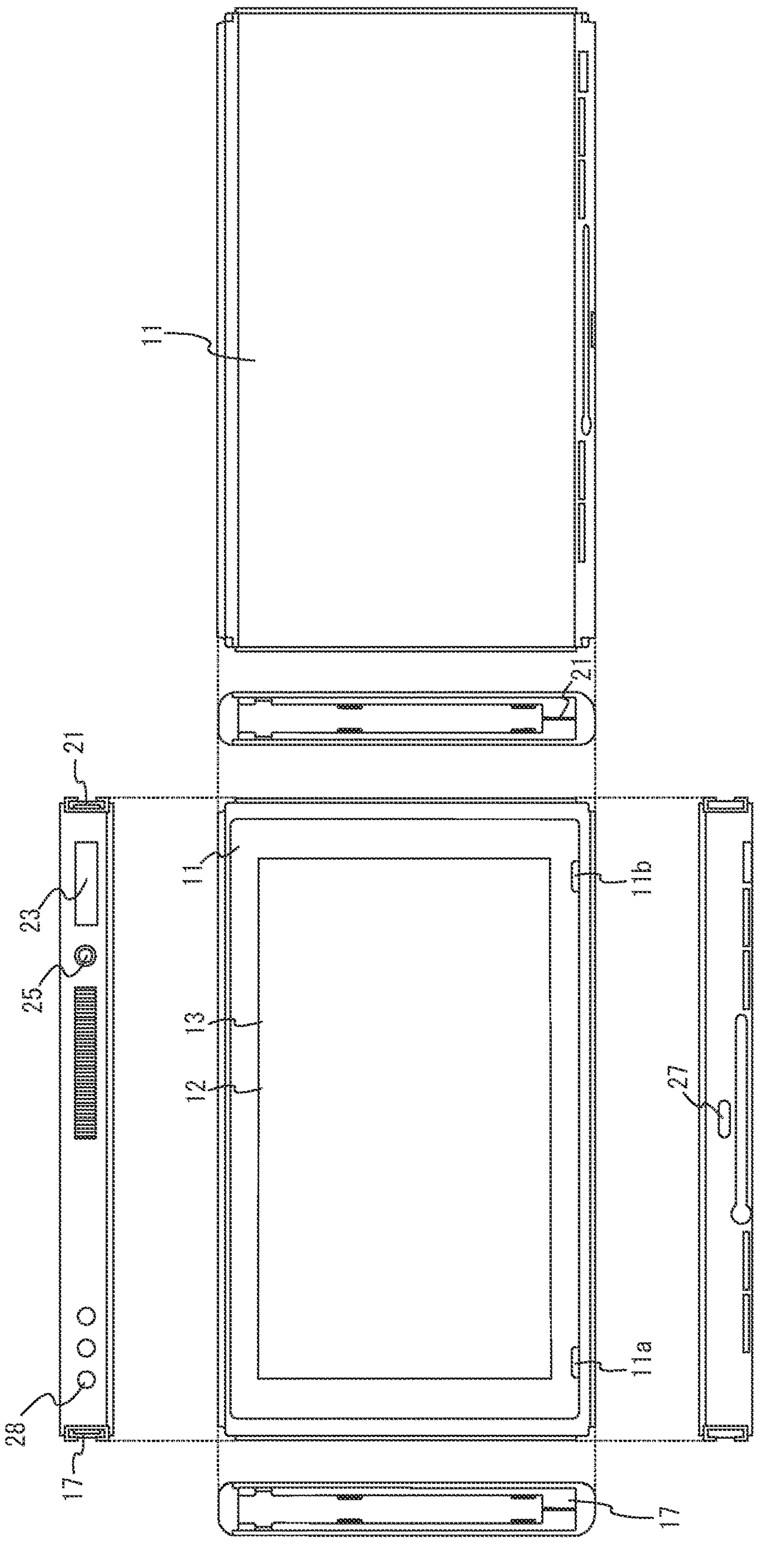
FIG. 3 is six orthogonal views showing a non-limiting example main body apparatus shown in FIG. 1 and FIG. 2.

FIG. 3 is six orthogonal views showing an example of the main body apparatus 2. As shown in FIG. 3, the main body apparatus 2 comprises a housing 11 having an approximately plate-shape. In the embodiment, a main surface (in other words, a surface on a front side, that is, a surface on which the display 12 is provided) of the housing 11 has a generally rectangular shape.

In addition, a shape and a size of the housing 11 are optional. As an example, the housing 11 may be of a portable size. Moreover, the main body apparatus 2 alone or the unified apparatus obtained by attaching the left controller 3 and the right controller 4 to the main body apparatus 2 may be a mobile apparatus. The main body apparatus 2 or the unified apparatus may be a handheld apparatus. The main body apparatus 2 or the unified apparatus may be a handheld apparatus or a portable apparatus.

As shown in FIG. 3, the main body apparatus 2 comprises the display 12 that is provided on the main surface of the housing 11. The display 12 displays an image generated by the main body apparatus 2. In the embodiment, the display 12 is a liquid crystal display device (LCD). However, the display 12 may be an arbitrary type display.

Moreover, the main body apparatus 2 comprises a touch panel 13 on a screen of the display 12. In the embodiment, the touch panel 13 is of a type that allows a multi-touch input (e.g., a capacitive type). However, the touch panel 13 may be of any type, and for example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11*a* and 11*b* are formed on the main surface of the housing 11. Then, sounds output from the speakers 88 are emitted through the speaker holes 11*a* and 11*b*.

Moreover, the main body apparatus 2 comprises a left terminal 17 that is a terminal for the main body apparatus 2 to perform wired communication with the left controller 3, and a right terminal 21 that is a terminal for the main body apparatus 2 performs wired communication with the right controller 4.

As shown in FIG. 3, the main body apparatus 2 comprises a slot 23. The slot 23 is provided on an upper side surface of the housing 11. The slot 23 has a shape to which a predetermined type of storage medium can be attached. The predetermined type of storage medium is, for example, a dedicated storage medium (e.g., a dedicated memory card) for the game system 1 or an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Moreover, the main body apparatus 2 comprises a power button 28.

The main body apparatus 2 comprises a lower terminal 27. The lower terminal 27 is a terminal through which the main body apparatus 2 performs communication with a cradle. In the embodiment, the lower terminal 27 is a USB connector (more specifically, a female connector). When the unified apparatus or the main body apparatus 2 alone is put on the cradle, the game system 1 can display on a stationary monitor an image generated by and output from the main body apparatus 2. Moreover, in the embodiment, the cradle has the function of charging the unified apparatus or the main body apparatus 2 alone that is put on the cradle. Moreover, the cradle has a function of a hub device (specifically, a USB hub).

Figure 4:
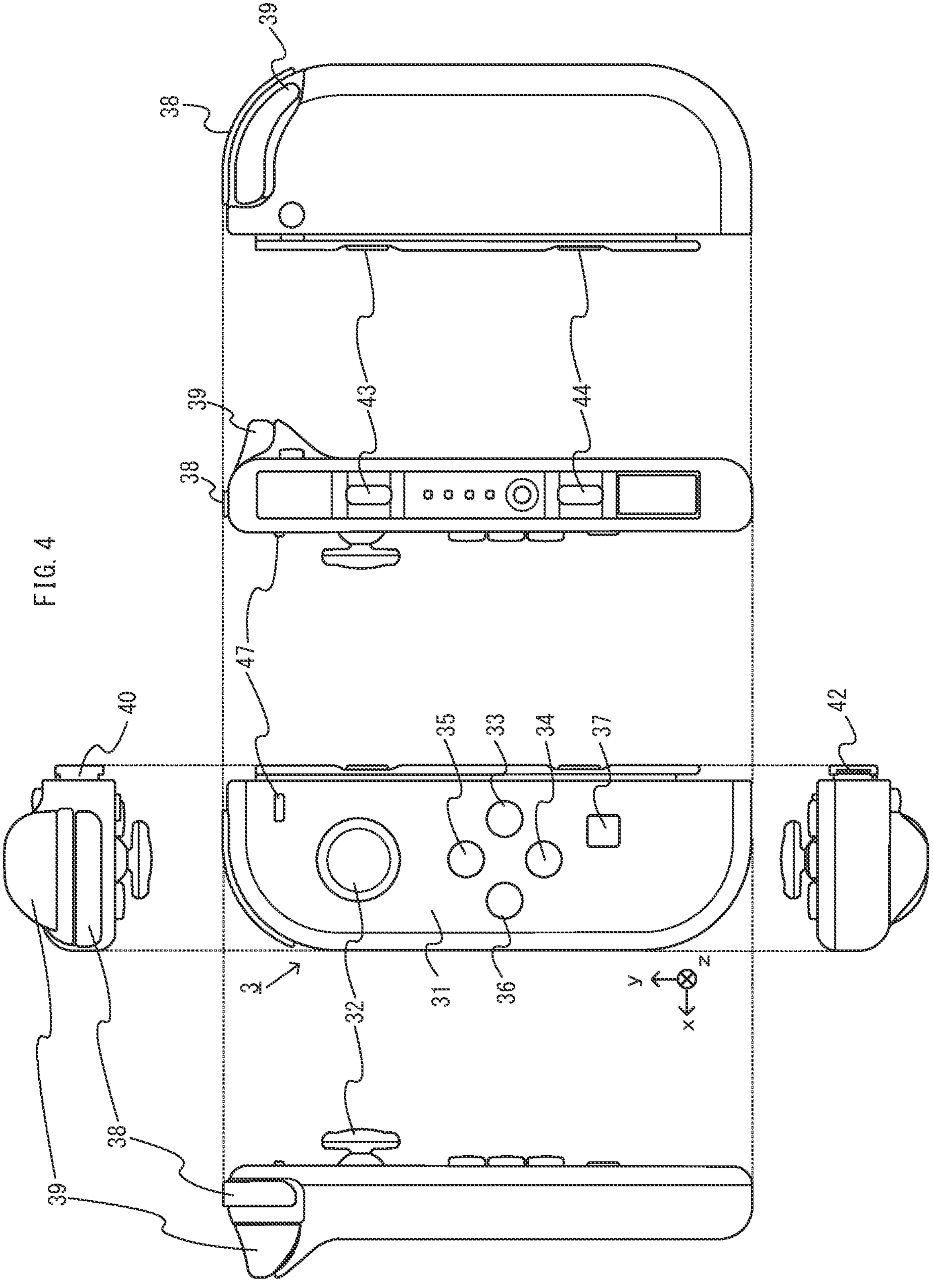
FIG. 4 is sixth orthogonal views showing a non-limiting example left controller shown in FIG. 1 and FIG. 2.

FIG. 4 is six orthogonal views showing an example of the left controller 3. As shown in FIG. 4, the left controller 3 comprises a housing 31. In the embodiment, the housing 31 has a vertically long shape, that is, is shaped to be long in an up-down direction (i.e., a y-axis direction shown in FIG. 1 and FIG. 4). In a state where the left controller 3 is detached from the main body apparatus 2, the left controller 3 can also be held in a direction that the left controller 3 is vertically long. The housing 31 has a shape and a size that when held in a direction that the housing 31 is vertically long, the housing 31 can be held with one hand, especially the left hand. Moreover, the left controller 3 can also be held in a direction that the left controller 3 is horizontally long. When held in the direction that the left controller 3 is horizontally long, the left controller 3 may be held with both hands.

The left controller 3 comprises an analog stick 32. As shown in FIG. 4, the analog stick 32 is provided on a main surface of the housing 31. The analog stick 32 can be used as a direction input section capable of inputting a direction. The user tilts the analog stick 32 and thereby can input a direction corresponding to a tilted direction (and input a magnitude corresponding to a tilted angle). In addition, the left controller 3 may comprise a cross key or a slide stick capable of performing a slide input, or the like as the direction input section, instead of the analog stick. Moreover, in the embodiment, it is possible to provide an input by pressing the analog stick 32. The left controller 3 comprises various operation buttons.

The left controller 3 comprises four (4) operation buttons 33-36 (specifically, a right direction button 33, a down direction button 34, an up direction button 35 and a left direction button 36) on the main surface of the housing 31. Furthermore, the left controller 3 comprises a record button 37 and a "−" (minus) button 47. The left controller 3 comprises an L-button 38 and a ZL-button 39 in an upper left portion of a side surface of the housing 31. Moreover, the left controller 3 comprises an SL-button 43 and an SR-button 44 on a surface at a side to be attached to the main body apparatus 2 out of side surfaces of the housing 31. These operation buttons are used to input instructions according to various programs (e.g., an OS program and an application program) executed by the main body apparatus 2.

Moreover, the left controller 3 comprises a terminal 42 for the left controller 3 to perform wired communication with the main body apparatus 2.

Figure 5:
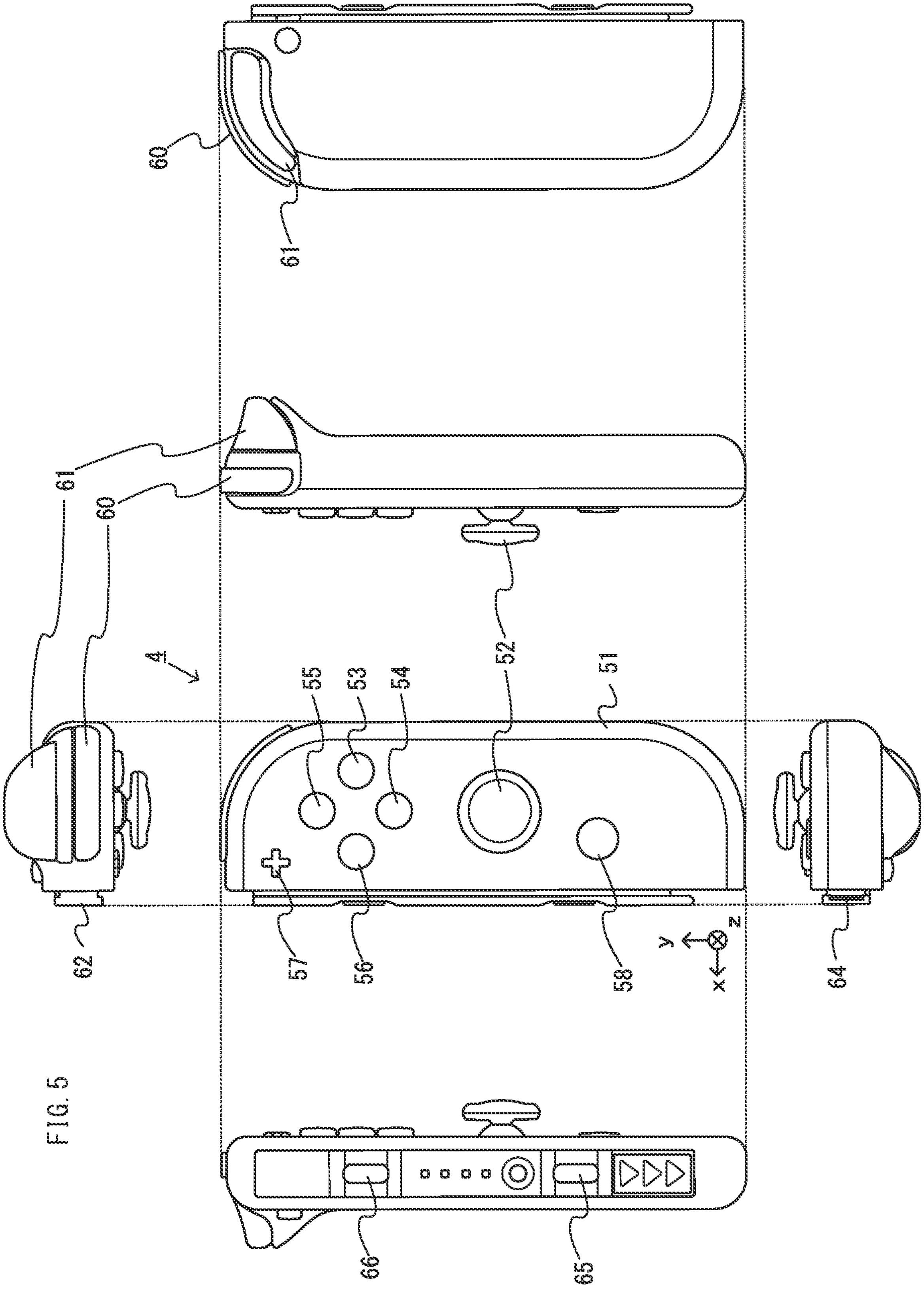
FIG. 5 is sixth orthogonal views showing a non-limiting example right controller shown in FIG. 1 and FIG. 2.

FIG. 5 is six orthogonal views showing an example of the right controller 4. As shown in FIG. 5, the right controller 4 comprises a housing 51. In the embodiment, the housing 51 has a vertically long shape, that is, a shape long in the up-down direction. In a state where the right controller 4 is detached from the main body apparatus 2, the right controller 4 can also be held in a direction that the right controller 4 is vertically long. The housing 51 has a shape and a size that when held in a direction that the housing 51 is vertically long, the housing 51 can be held with one hand, especially the right hand. Moreover, the right controller 4 can also be held in a direction that the right controller 4 is horizontally long. When held in the direction that the right controller 4 is horizontally long, the right controller 4 may be held with both hands.

Similar to the left controller 3, the right controller 4 comprises an analog stick 52 as a direction input section. In the embodiment, the analog stick 52 has the same configuration as that of the analog stick 32 of the left controller 3. Moreover, the right controller 4 may comprise a cross key or a slide stick capable of performing a slide input, or the like as the direction input section, instead of the analog stick. Moreover, similar to the left controller 3, the right controller 4 comprises four (4) operation buttons 53-56 (specifically, an A-button 53, a B-button 54, an X-button 55 and a Y-button 56) on the main surface of the housing 51. Furthermore, the right controller 4 comprises a "+" (plus) button 57 and a home button 58. Moreover, the right controller 4 comprises an R-button 60 and a ZR-button 61 in an upper right portion of a side surface of the housing 51. Moreover, similar to the left controller 3, the right controller 4 comprises an SL-button 65 and an SR-button 66.

Moreover, the right controller 4 comprises a terminal 64 for the right controller 4 to perform wired communication with the main body apparatus 2.

Figure 6:
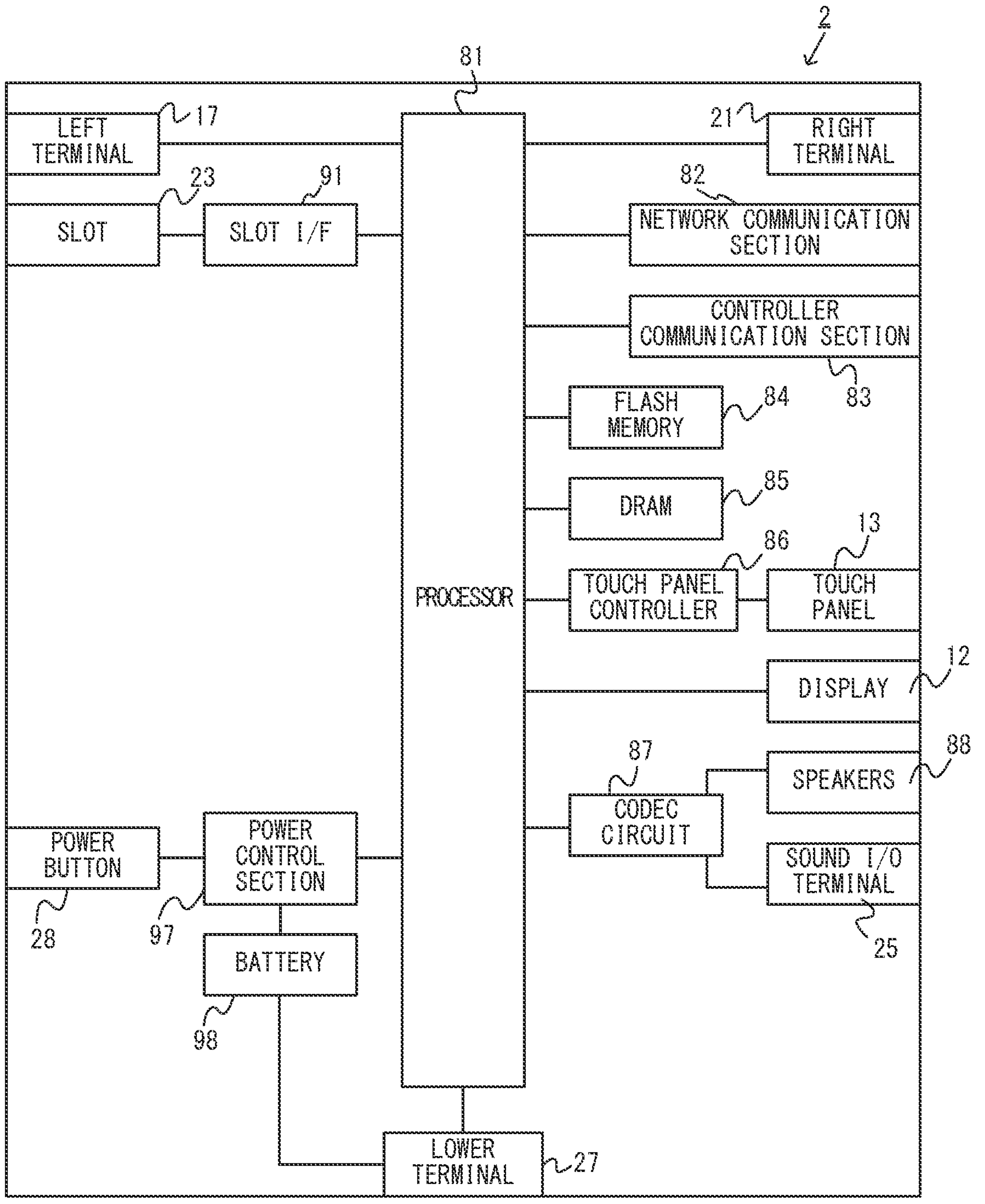
FIG. 6 is a block diagram showing a non-limiting example internal configuration of the main body apparatus shown in FIG. 1 and FIG. 2.

FIG. 6 is a block diagram showing an example of an internal configuration of the main body apparatus 2. The main body apparatus 2 comprises components 81-91, 97 and 98 shown in FIG. 6 in addition to components shown in FIG. 3. Some of the components 81-91, 97 and 98 may be mounted as electronic components on an electronic circuit board to be accommodated in the housing 11.

The main body apparatus 2 comprises a processor 81. The processor 81 is an information processing section that performs various types of information processing to be performed by the main body apparatus 2, and may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 comprises a flash memory 84 and a DRAM (Dynamic Random Access Memory) 85 as examples of internal storage media incorporated in the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 comprises a slot interface (hereinafter, abbreviated as "I/F") 91. The slot OF 91 is connected to the processor 81. The slot OF 91 is connected to the slot 23, and reads and writes, in accordance with instructions from the processor 81, data from and to the predetermined type of storage medium (e.g., a dedicated memory card) attached to the slot 23.

The processor 81 appropriately reads and writes data from and to the flash memory 84, the DRAM 85 and each of the above storage media, thereby performing the above-described information processing.

The main body apparatus 2 comprises a network communication section 82. The network communication section 82 is connected to the processor 81. The network communication section 82 performs communication (specifically, wireless communication) with external apparatus via a network. In the embodiment, as a first communication manner, the network communication section 82 is connected to a wireless LAN (Local Area Network) to perform communication with external apparatus by a system in conformity with the Wi-Fi standard. Moreover, as a second communication manner, the network communication section 82 performs wireless communication with a further main body apparatus 2 of the same type by a predetermined communication system (e.g., communication based on a unique protocol or infrared light communication). In addition, the wireless communication in the above-described second communication manner achieves a function of enabling so-called "local communication", in which the main body apparatus 2 can perform wireless communication with further main body apparatus 2 placed in a closed LAN, and a plurality of main body apparatus 2 perform communication directly with each other to transmit and receive data.

The main body apparatus 2 comprises a controller communication section 83. The controller communication section 83 is connected to the processor 81. The controller communication section 83 performs wireless communication with the left controller 3 and/or the right controller 4. Although communication system between the main body apparatus 2 and the left controller 3 and the right controller 4 is optional, in the embodiment, the controller communication section 83 performs communication with the left controller 3 and with the right controller 4 in conformity with Bluetooth (registered trademark) standard.

The processor 81 is connected to the left terminal 17, the right terminal 21 and the lower terminal 27. When performing wired communication with the left controller 3, the processor 81 transmits data to the left controller 3 via the left terminal 17 and receives (or acquires) operation data from the left controller 3 via the left terminal 17. Moreover, when performing wired communication with the right controller 4, the processor 81 transmits data to the right controller 4 via the right terminal 21 and receives (or acquires) operation data from the right controller 4 via the right terminal 21. Moreover, when performing communication with the cradle, the processor 81 transmits data to the cradle via the lower terminal 27. Thus, in the embodiment, the main body apparatus 2 can perform both wired communication and wireless communication with each of the left controller 3 and the right controller 4. Moreover, when the unified apparatus formed by attaching the left controller 3 and the right controller 4 to the main body apparatus 2 or the main body apparatus 2 alone is attached to the cradle, the main body apparatus 2 can output data (e.g., display image data and sound data) to the stationary monitor or the like via the cradle.

Here, the main body apparatus 2 can perform communication with a plurality of left controllers 3 simultaneously (in other words, in parallel). Moreover, the main body apparatus 2 can perform communication with a plurality of right controllers 4 simultaneously (in other words, in parallel). Therefore, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 comprises a touch panel controller 86 that is a circuit for controlling the touch panel 13. The touch panel controller 86 is connected between the touch panel 13 and the processor 81. Based on a signal from the touch panel 13, the touch panel controller 86 generates, for example, data indicating a position where a touch input is performed, and outputs the data to the processor 81.

Moreover, the display 12 is connected to the processor 81. The processor 81 displays a generated image (e.g., an image generated by performing the above information processing) and/or an externally acquired image on the display 12.

The main body apparatus 2 comprises a codec circuit 87 and speakers (specifically, a left speaker and a right speaker) 88. The codec circuit 87 is connected to the speakers 88 and a sound input/output (I/O) terminal 25 and also connected to the processor 81. The codec circuit 87 is a circuit for controlling an input/output of sound data to and from the speakers 88 and the sound input/output terminal 25.

The main body apparatus 2 comprises a power control section 97 and a battery 98. The power control section 97 is connected to the battery 98 and the processor 81. Moreover, although not shown in FIG. 6, the power control section 97 is connected to respective components of the main body apparatus 2 (specifically, components that receive power supplied from the battery 98, the left terminal 17 and the right terminal 21). Based on a command from the processor 81, the power control section 97 controls power supply from the battery 98 to the above-described components.

Moreover, the battery 98 is connected to the lower terminal 27. When an external charging device (e.g., a cradle) is connected to the lower terminal 27, and power is supplied to the main body apparatus 2 via the lower terminal 27, the battery 98 is charged with the supplied power.

Figure 7:
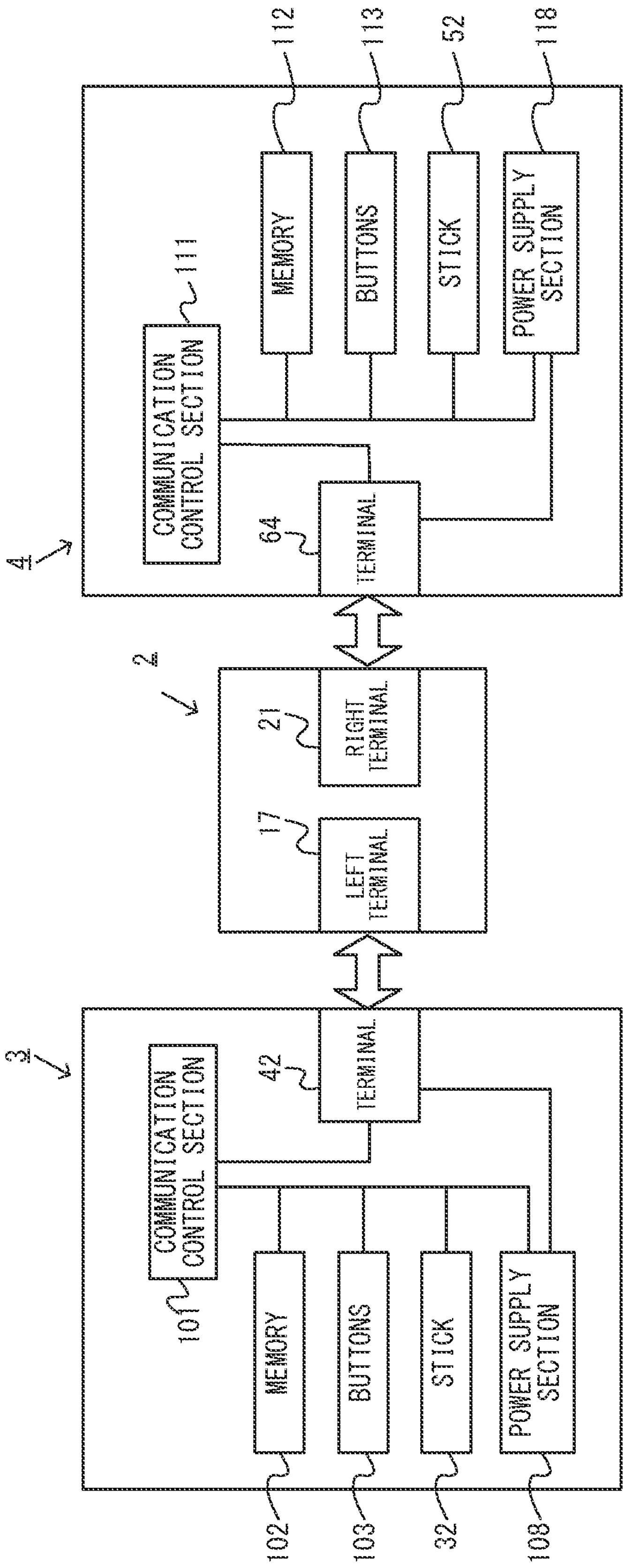
FIG. 7 is a block diagram showing non-limiting example internal configurations of the main body apparatus, the left controller and the right controller shown in FIG. 1 and FIG. 2.

FIG. 7 is a block diagram showing examples of internal configurations of the main body apparatus 2, the left controller 3 and the right controller 4. In addition, details of the internal configuration of the main body apparatus 2 are shown in FIG. 6 and thus are omitted in FIG. 7.

The left controller 3 comprises a communication control section 101 that performs communication with the main body apparatus 2. As shown in FIG. 7, the communication control section 101 is connected to components including the terminal 42. In the embodiment, the communication control section 101 can perform communication with the main body apparatus 2 through both wired communication via the terminal 42 and wireless communication not via the terminal 42. The communication control section 101 controls a method of performing communication by the left controller 3 with the main body apparatus 2.

That is, when the left controller 3 is attached to the main body apparatus 2, the communication control section 101 performs communication with the main body apparatus 2 via the terminal 42. Moreover, when the left controller 3 is detached from the main body apparatus 2, the communication control section 101 performs wireless communication with the main body apparatus 2 (specifically, the controller communication section 83). The wireless communication between the communication control section 101 and the controller communication section 83 is performed in accordance with Bluetooth (registered trademark) standard, for example.

Moreover, the left controller 3 comprises a memory 102 such as a flash memory. The communication control section 101 is constituted by a microcomputer (also referred to as a microprocessor), for example, and executes firmware stored in the memory 102, thereby performing various processing.

The left controller 3 comprises buttons 103 (specifically, the buttons 33-39, 43, 44 and 47). Further, the left controller 3 comprises the analog stick (in FIG. 7, indicated as "stick") 32. The respective buttons 103 and the analog stick 32 outputs information regarding an operation performed to itself to the communication control section 101 repeatedly at appropriate timings.

The communication control section 101 acquires information regarding an input(s) (specifically, information regarding an operation or the detection results of the sensors) from respective input sections (specifically, the buttons 103, the analog stick 32 and the sensors 104 and 105). The communication control section 101 transmits operation data including the acquired information (or information obtained by performing predetermined processing on the acquired information) to the main body apparatus 2. In addition, the operation data is transmitted repeatedly, once every predetermined time period. In addition, the interval that the information regarding an input(s) is transmitted from each of the input sections to the main body apparatus 2 may or may not be the same.

The above-described operation data is transmitted to the main body apparatus 2, whereby the main body apparatus 2 can obtain an input(s) provided to the left controller 3. That is, the main body apparatus 2 can determine operations on the buttons 103 and the analog stick 32 based on the operation data.

The left controller 3 comprises a power supply section 108. In the embodiment, the power supply section 108 has a battery and a power control circuit. Although not shown, the power control circuit is connected to the battery and also connected to components of the left controller 3 (specifically, components that receive power supplied from the battery).

As shown in FIG. 7, the right controller 4 comprises a communication control section 111 that performs communication with the main body apparatus 2. Moreover, the right controller 4 comprises a memory 112 connected to the communication control section 111. The communication control section 111 is connected to components including the terminal 64. The communication control section 111 and the memory 112 have functions similar to those of the communication control section 101 and the memory 102, respectively, of the left controller 3. Therefore, the communication control section 111 can perform communication with the main body apparatus 2 through both wired communication via the terminal 64 and wireless communication not via the terminal 64 (specifically, communication in conformity with the Bluetooth (registered trademark) standard), and a method of communication to be performed with the main body apparatus 2 is controlled by the right controller 4.

The right controller 4 comprises input sections similar to the input sections of the left controller 3. Specifically, the right controller 4 comprises buttons 113 and the analog stick 52. These input sections have functions similar to those of the input sections of the left controller 3 and operate similarly to the input sections of the left controller 3.

The right controller 4 comprises a power supply section 118. The power supply section 118 has a function similar to the power supply section 108 of the left controller 3, and operates similarly to the power supply section 108.

Figure 8:
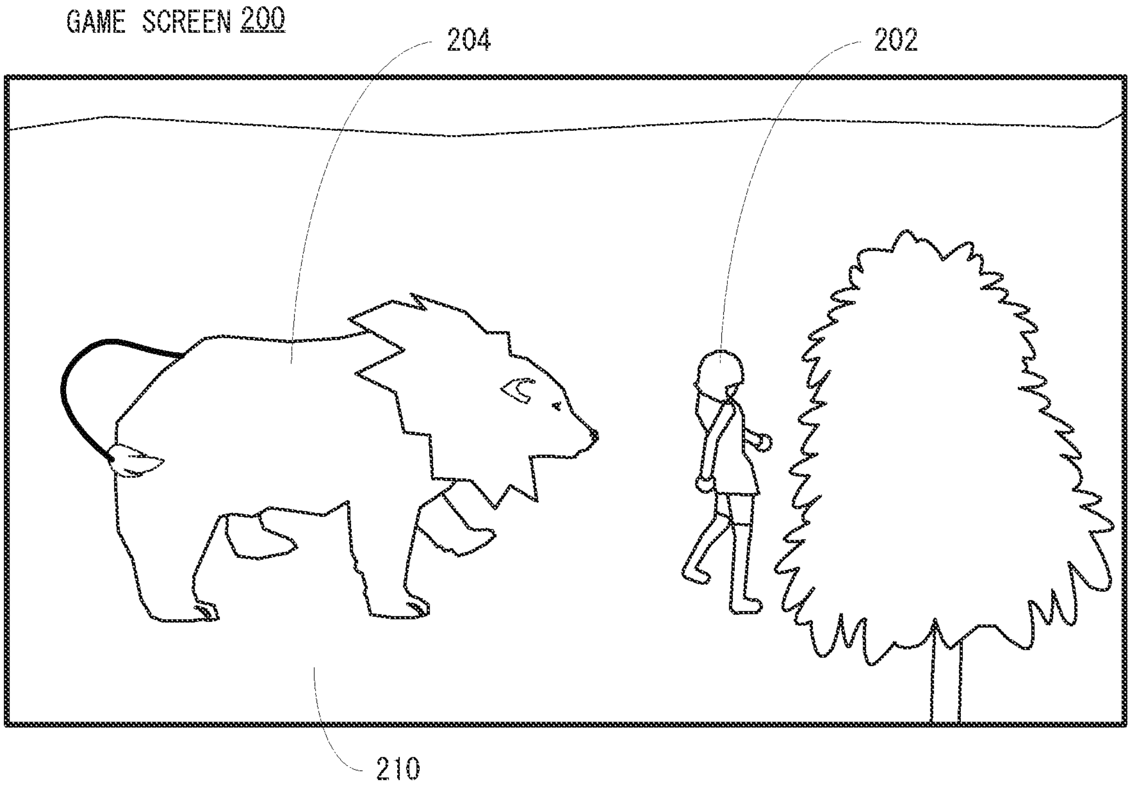
FIG. 8 is a view showing a non-limiting first example game screen of the embodiment.

Next, with reference to FIG. 8-FIG. 18, an outline of game control processing of a virtual game that is executable in the game system 1 of this embodiment will be described. FIG. 8 is a view showing a non-limiting example game image displayed on a display device (e.g., the display 12) when executing an application of the virtual game of the embodiment.

The main body apparatus 2 functions also as an image processing apparatus, and generates and outputs (displays) display image data corresponding to various kinds of screens such as a game image. The processor 81 arranges various kinds of objects and characters in a three-dimensional virtual space, thereby to generate a certain sight or situation (scene). An image that this scene is shot by a virtual camera (viewed from a viewpoint) is displayed on the display 12 as the game image.

A game image shown in FIG. 8 is a non-limiting example game screen 200. The game screen 200 includes a player character 202, a first fellow character 204 and a plurality of background objects 210. Moreover, an item(s) and/or a non-player character(s) may be included in the game screen 200.

The player character 202 (equivalent to a first player character) is an object or character whose an action or operation is controlled by a user or player (hereinafter, simply referred to as "player"). In the embodiment, the player character 202 is a main object or character imitating a human being. As the action or operation of the player character 202, in a certain virtual place, i.e., a virtual space, moving, acquiring an item, using an item, stopping a movement of an enemy character, being combined with a second fellow character 206 that is transformed from a first fellow character 204, making the second fellow character 206 be separated, talking with a non-player character, etc. correspond. Moreover, in the embodiment, the item includes various objects, such as tools (including weapon and protector) that the player character 202 uses or possesses, shoes, gloves, hats or caps, medicine, treasure, coins (money), etc.

The first fellow character 204 (equivalent to a second player character) is an object or character whose an action or operation is controlled by the player. In the embodiment, the first fellow character 204 is an object imitating an animal, and is a fellow or partner object of the main object. As the action or operation of the first fellow character 204, in the virtual space, moving, acquiring an item, attacking an enemy character 208 (described later), being transformed into the second fellow character 206 (equivalent to a second player character as similar to the first fellow character 204) to be combined with the player character 202, returning to an original first fellow character 204 when being separated from the player character 202, etc. correspond.

Moreover, the non-player character including the enemy character 208 is an object or character whose an action or operation is controlled by a computer (processor 81 of FIG. 6), not by the player. As an example, the non-player character includes an object imitating a human being except the player character 202. Alternatively, the non-player character is an object imitating an animal except first fellow character 204 and the second fellow character 206. As the action or operation of the non-player character, in the virtual space, moving, attacking the player character 202 or the fellow character (204 or 206), talking with the player character 202, passing an item to the player character 202, etc. correspond.

The background objects 201 is a terrain object to be arranged in the virtual space. In the embodiment, the terrains include ground (including roads, land, flower gardens, farmland, etc.), slopes, floors, trees, grass, flowers, buildings, stairs, bridges, water surfaces (including rivers, ponds, lakes, seas, etc.), holes, caves, cliffs, pillars, walls, fences, palings, etc.

In the embodiment, the player moves the player character 202 and the fellow character (204 or 206) in the virtual space, thereby to advance a virtual game by defeating the enemy character 208 (see FIG. 12), acquiring an item, using an item, solving tricks set in the virtual space, and so on. The virtual game is completed or becomes a game clear when defeating a boss (last) enemy character 208.

Moreover, in the embodiment, the player can play a virtual game by selecting, as a state where the player operates the player character 202 and the fellow character (204, 206) (hereinafter a "operation state"), a state where the player character 202 and the first fellow character 204 are individually moved (hereinafter, referred to as "separated state") or a state where the second fellow character 206 that is transformed from the first fellow character 204 is combined or integrated with the player character 202 to be moved together (hereinafter, referred to as "combined state").

In the separated state (or separated mode) where the player character 202 and the first fellow character 204 are separated from each other as shown in FIG. 8, the player character 202 and the first fellow character 204 act separately. This means that movements of respective characters (204 and 204) are controlled by different analog sticks (32, 52). As an example, the player character 202 faces in a direction that the analog stick 32 is tilted and is moved in the direction, and the first fellow character 204 faces in a direction that the analog stick 52 is tilted and is moved in the direction. If approaching or arriving at a position of an item that is placed in the virtual space, the player character 202 and the first fellow character 204 acquire the item.

Moreover, if the ZL button 39 is operated when the enemy character 208 appears in the separated state, a magic circle 230 is made to appear in a direction that the player character 202 faces, and the player character 202 stops an action of the enemy character 208 existing inside the magic circle 230. While the ZL button 39 is being operated (i.e., continued to be turned on), the magic circle 230 is moved to approach a position of the enemy character 208 gradually. Moreover, if the analog stick 32 is operated in a state where the ZL button 39 is being operated (i.e., continued to be turned on), the player character 202 is moved in a state of making the magic circle 230 appear. In this case, the player character 202 and the magic circle 230 are moved while maintaining a direction of the player character 202 and a positional relationship between the player character 202 and the magic circle 23, at the time of the ZL button 39 being operated first. That is, when the player character 202 is moved in a state of continuing turning on the ZL button, a direction of the player character 202 is not changed but performs movement such as parallel translation. However, even in this case, the direction of the player character 202 may be changed.

In addition, since the positional relationship between the player character 202 and the magic circle 230 is maintained when the player character 202 is moved in a state where the magic circle 230 appears, only the magic circle 230 is not moved so as to approach the position of the enemy character 208.

Moreover, in the separated state, if the R button 60 is operated, the first fellow character 204 attacks in a direction that first fellow character 204 faces with a certain action. If the ZR button 61 is operated, the first fellow character 204 attacks in a direction that first fellow character 204 faces with an action different from that in a case of operating the R button 60. In the embodiment, if the R button 60 is operated, the first fellow character 204 attacks the enemy character 208 by applying a shock wave, applying an electric shock, spitting water, blowing fire or extending a vine-like tongue. The attack action by an operation of the R button 60 is determined by an attribute of the first fellow character 204. In the embodiment, the attribute is a normal attribute, a water attribute, a fire attribute, a grass attribute or an electric attribute. When the ZR button 61 is operated, the first fellow character 204 attacks the enemy character 208 by biting the enemy character 208 or scratching the enemy character 208.

Figure 9:
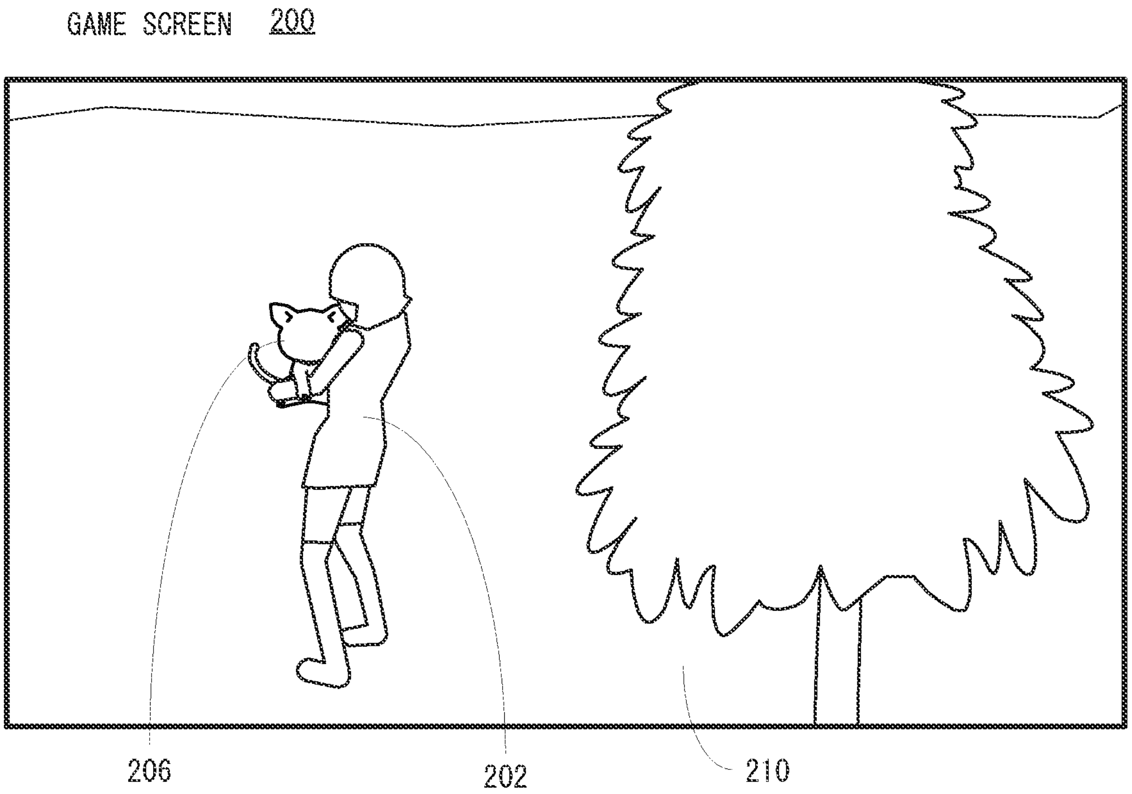
FIG. 9 is a view showing a non-limiting second example game screen of the embodiment.

A game image shown in FIG. 9 is another non-limiting example game screen 200. In the combined state (or combined mode) where the player character 202 and the second fellow character 206 combined with each other as shown in FIG. 9, the player character 202 and the second fellow character 206 are moved together. This means that a movement of respective characters (202, 206) is operated by a single analog stick (32). As an example, the player character 202 is moved in a direction that the analog stick 32 is tilted, and the second fellow character 206 is moved together with the player character 202. In also the combined state, if approaching or arriving at a position of an item placed in the virtual space, the player character 202 acquires the item.

As shown also in FIG. 9, in the combined state, the player character 202 is holding the second fellow character 206 that imitates an animal in arms. As described above, the second fellow character 206 is a character imitating a small animal that the first fellow character 204 is transformed. The second fellow character 206 is also a character of a fellow of the player character 202. Since the first fellow character 204 and the second fellow character 206 have different appearances, it is easy to understand whether the current operation state (or operation mode) is the separated state or the combined state just by looking at these second player characters.

Figure 15:
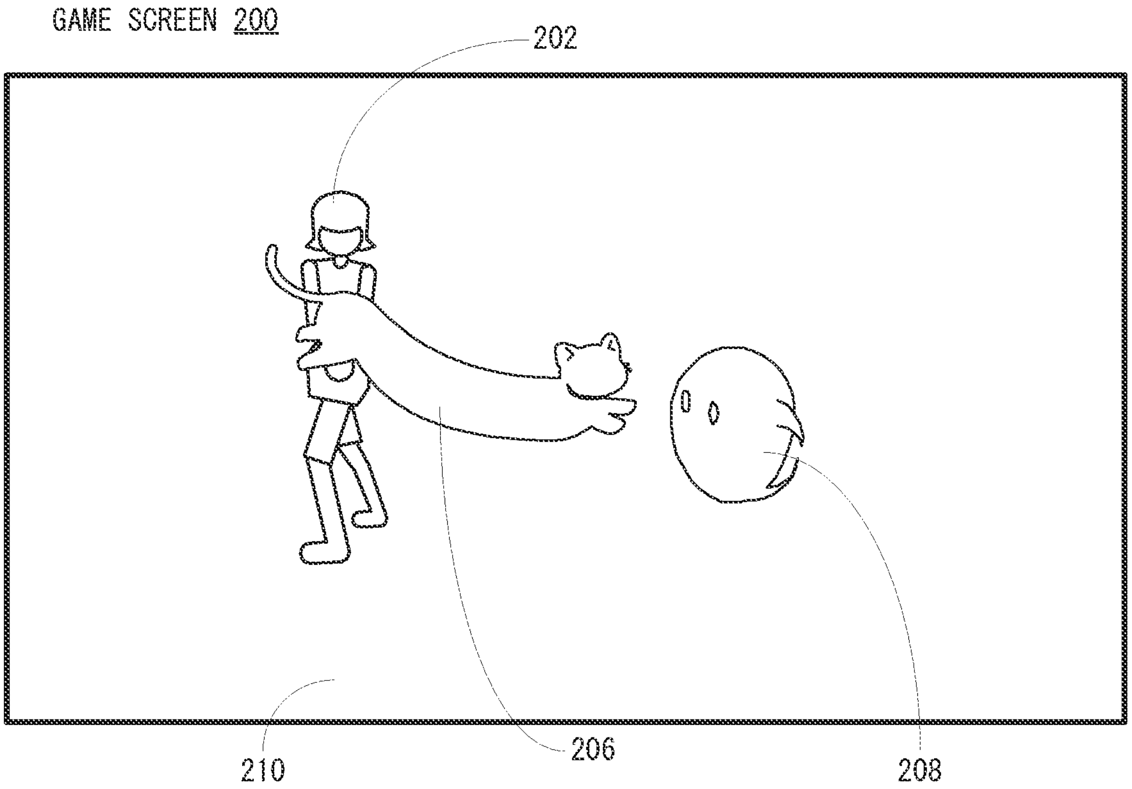
FIG. 15 is a view showing a non-limiting sixth example game screen of the embodiment.

Moreover, in the combined state, the second fellow character 206 is elongated in a direction that the analog stick 52 is tilted (see FIG. 15). In this case, if approaching an item, the second fellow character 206 acquires the item. Moreover, if the ZR button 61 is further operated in a state where the second fellow character 206 is elongated, the second fellow character 206 attacks the enemy character 208. The second fellow character 206 attacks the enemy character 208 by biting or scratching the enemy character 208. However, the second fellow character 206 attacks toward a direction that its body is elongated, i.e., a direction that the analog stick 52 is tilted.

However, the second fellow character 206 elongates the body by only a predetermined length toward the direction that the analog stick 52 is tilted from the position that the second fellow character 206 is held by the player character 202 in arms. That is, the second fellow character 206 is elongated in the direction that the analog stick 52 is tilted by a predetermined length based on the position of the player character 202 irrespective of an operating amount, i.e., tilting amount of the analog stick 52. The second fellow character 206 may be elongated a neck or front legs by a predetermined length instead of the body.

Moreover, while the player is performing a tilting operation of the analog stick 52, the second fellow character 206 remains being elongated in the tilting direction. If the player stops the tilting operation of the analog stick 52, that is, if the player returns the analog stick 52 to a state of not tilted, the body of the second fellow character 206 returns to its original length, and the second fellow character 206 becomes into a state of being held by the player character 202 in arms.

Thus, in a state where the player character 202 is combined or integrated with the second fellow character 206, the player character 202 and the second fellow character 206 are moved together by a tilting operation of one analog stick 32, and the second fellow character 206 is elongated based on the position of the player character 202 by a tilting operation of the other analog stick 52, and the second fellow character 206 returns to its original state if stopping the tilting operation of the analog stick 52.

Moreover, in the combined state, it may make the second fellow character 206 be temporarily is isolated in a position away from by a predetermined distance in a direction that the analog stick 52 is tilted based on the position of the player character 202 irrespective of a tilting amount of the analog stick 52. However, because of the combined state, the second fellow character 206 is coupled to the player character 202 by a string or chain having a predetermined length, or coupled to the player character 202 by the ability such as magic or psychokinesis of the player character 202 or the second fellow character 206. In this case, the second fellow character 206 remains isolated in the tilting direction while performing the tilting operation of the analog stick 52 by the player, and the second fellow character 206 returns to a state of being held by the player character 202 in arms if stopping the tilting operation.

Moreover, if the ZR button 61 is operated in a state where the second fellow character 206 is not elongated the body, the second fellow character 206 attacks the enemy character 208 existing in the direction of the player character 202.

As shown in FIG. 9, in the combined state, the player character 202 is overlapped or contacted with the second fellow character 206. Moreover, in the combined state, when the second fellow character 206 is elongated, the player character 202 holds the foot of the second fellow character 206 in arms. However, in the combined state, the second fellow character 206 may wrap around the neck, arms or legs of player character 202 or ride on the back or shoulders of player character 202. Moreover, in the combined state, a part of second fellow character 206 may sink into the player character 202 to be integrated therewith.

As an example, the game screen 200 including the player character 202 and the second fellow character 206 in the combined state is displayed on the display 12 at the time of the start of the virtual game. If the R button 60 is operated in the combined state, the operation state is changed to the separated state from the combined state. That is, the second fellow character 206 is separated from the player character 202, and the second fellow character 206 is transformed into the first fellow character 204. That is, if the operation state is changed to the separated state from the combined state, the second fellow character 206 disappears and the first fellow character 204 appears. At this time, the first fellow character 204 appears immediately next to the player character 202.

However, when the second fellow character 206 disappears, the first fellow character 204 may appear after the second fellow character 206 may only disappear from the game screen 200, or the first fellow character 204 may appear gradually while the second fellow character 206 may be distant from the position of the player character 202 gradually.

Moreover, the first fellow character 204 does not need to appear immediately next to the player character 202, and may appear at any other position as long as it is based on the current position of the player character 202. For example, the first fellow character 204 may appear in front of or behind the player character 202.

Moreover, if the L button 38 is operated in the separated state, the operation state is changed to the combined state from the separated state. In the embodiment, the first fellow character 204 is transformed into the second fellow character 206 and moved to the player character 202, and the second fellow character 206 is combined with the player character 202 (in the embodiment, held by the player character in arms). That is, the first fellow character 204 disappears from the current position, and instead of the first fellow character 204, the second fellow character 206 appears, and the second fellow character 206 is combined with the player character 202. The first fellow character 204 actually disappears from the virtual space until the operation state is changed again to the separated state.

Thus, in the separated state, the player character 202 is moved by an operation of the analog stick 32 and the first fellow character 204 is moved by an operation of the analog stick 52, and in the combined state, the second fellow character 206 is moved along with the player character 202 by an operation of the analog stick 32, and the second fellow character 206 is elongated from the position of the player character 202 by an operation of the analog stick 52. Moreover, the operation state is to be changed between the separated state and the combined state, the L button 38 or the R button 60 may be operated. A surface on which the analog stick 32 is provided and a surface on which the L button 38 is provided are different from each other, and a surface on which the analog stick 52 is provided and a surface on which the R button 60 is provided are different from each other. Therefore, it is possible to change between the separated state and the combined state even while making the player character 202 and the fellow character (204, 206) move, respectively, and thus, it is possible to advance the virtual game smoothly.

Moreover, in the combined state, if the player operates the R button 60, the operation state is changed to the separated state from the combined state, and in the separated state, if the player operates the R button 60, the first fellow character 204 attacks the enemy character 208 according to the attack action according to the attribute. Thus, by using the R button 60 for changing to the separated state from the combined state in order to attack the enemy character 208 in the separated state, it is possible to make the player have strongly the consciousness that the right controller 4 is an operation portion for controlling the first fellow character 204.

Moreover, as described above, in the separated state, the player character 202 and the first fellow character 204 are moved individually. In the embodiment, when a distance between the player character 202 and the first fellow character 204 (hereinafter, referred to as "distance between characters") is equal to or less than a predetermined distance r1, the operation state can be changed to the combined state. As an example, the distance r1 is five meters in the virtual space. However, irrespective of the distance between characters, it may be made to be changeable to the combined state.

When the distance between characters is equal to or less than a predetermined distance r2, the player character 202 and the first fellow character 204 can be moved freely. In a case where the distance between characters exceeds the distance r2, if such a state is continued, it becomes game over. As an example, the distance r2 is set longer than the distance r1, and is ten meters in the virtual space.

It is possible to provide an interesting virtual game that the player character 202 and the first fellow character 204 are not separated from each other too much.

When it becomes game over, the player character 202 and the fellow character (204, 206) are returned to predetermined positions while maintaining a remaining hit point (HP) of each of the player character 202 and the fellow character (204, 206), the possessed item of the player character 202 and the progress degree of the virtual game. Alternatively, when it becomes game over, a remaining hit point (HP) of each of the player character 202 and the fellow character (204, 206), the possessed item of the player character 202 and the progress degree of the virtual game may be returned to those at the time of last save.

Figure 10:
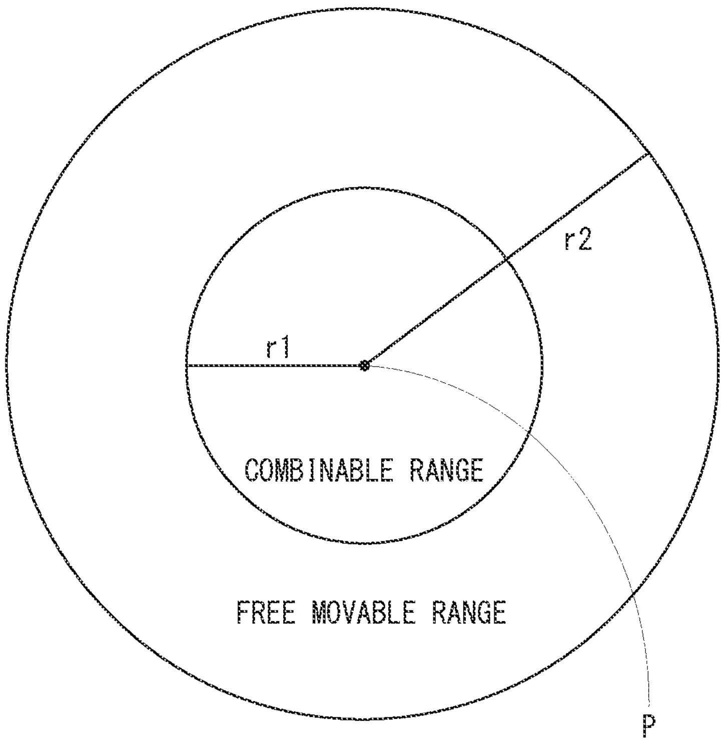
FIG. 10 is a view showing non-limiting example combinable range and free moving range for a player character and a first fellow character.

As shown in FIG. 10, in assuming that a position P of the player character 202 is a reference, a range having a distance r1 as a radius is a combinable range of the player character 202 and the first fellow character 204. Moreover, a range having a distance r2 as a radius is a range that the player character 202 and the first fellow character 204 are individually moved freely (hereinafter, referred to as "free movable range"). However, FIG. 10 shows the combinable range and the free movable range when the virtual space is viewed from right above. That is, in the embodiment, the distance between characters is a distance in a horizontal plane. However, since there are terrains with height differences in the virtual space, the distance between characters may be a straight line distance. As described above, when making possible to change to the combined state irrespective of the distance between characters, the combinable range is not set.

Figure 11:
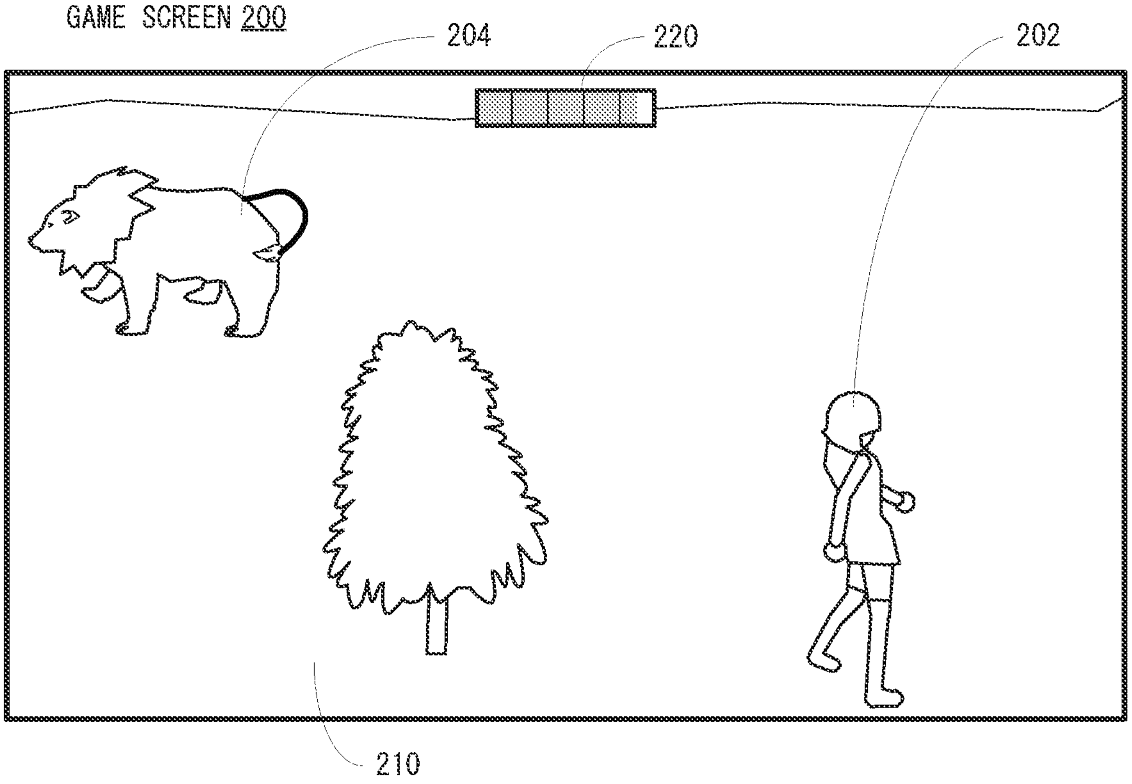
FIG. 11 is a view showing a non-limiting third example game screen of the embodiment.

A game image shown in FIG. 11 is another non-limiting example game screen 200. FIG. 11 shows an initial game screen 200 at the time that the distance between characters exceeds the distance r2 and the count of a lapse time period is started. When the count of the lapse time period is started, a display frame 220 is displayed in the center of the upper end of the game screen 200. The display frame 220 is a gauge of a length corresponding to a predetermined time period (e.g., five seconds), and a position of a scale is indicated by a length of a filled portion within the display frame 220. The filled portion within the display frame 220 is decreased gradually as the lapse time period is counted, and when the filled portion is lost, i.e., when the scale reaches zero (0), it becomes game over.

However, if the distance between characters becomes within the distance r2, the count of the lapse time period is stopped and reset. Moreover, the predetermined time period is made to be shortened as the distance between characters becomes longer after the distance between characters exceeds the distance r2. In the embodiment, before the predetermined time period is shortened, if one second is counted as the lapse time period, the length of the filled portion is shortened by one division; however, after the predetermined time period is shortened, if one second is counted as the lapse time period, the length of the filled portion is shortened by more than one division.

Thus, since the game over is not determined immediately even if the distance between characters exceeds the distance r2, by giving the player a certain amount of grace, but shortening the predetermined time period when the distance between characters is still longer, it is possible to provide a more interesting virtual game.

Although illustration is omitted, when the player character 202 or the first fellow character 204 comes outside the game screen 200, an image by which a moving direction of the player character 202 or the first fellow character 204 can be understood may be displayed in the game screen 200. In this case, it is possible to make it is easy to move the player character 202 or the first fellow character 204 having come outside the game screen 200 so as to be returned in the game screen 200.

Figure 12:
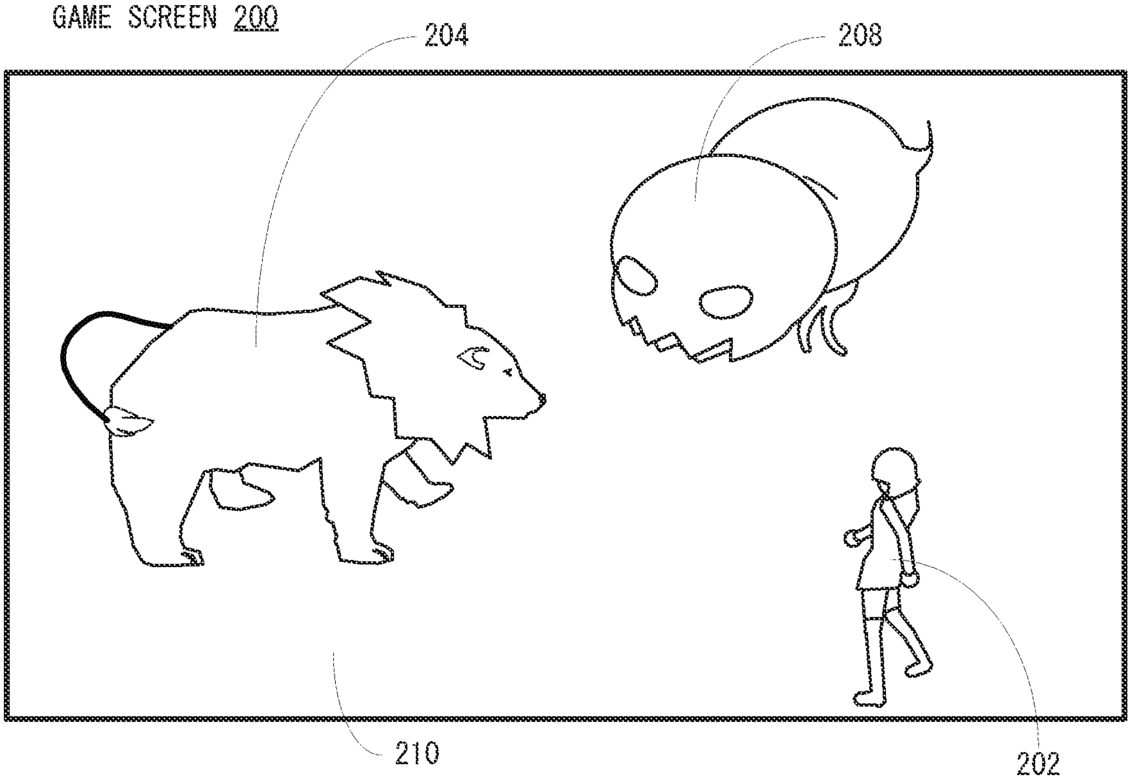
FIG. 12 is a view showing a non-limiting fourth example game screen of the embodiment.
Figure 13:
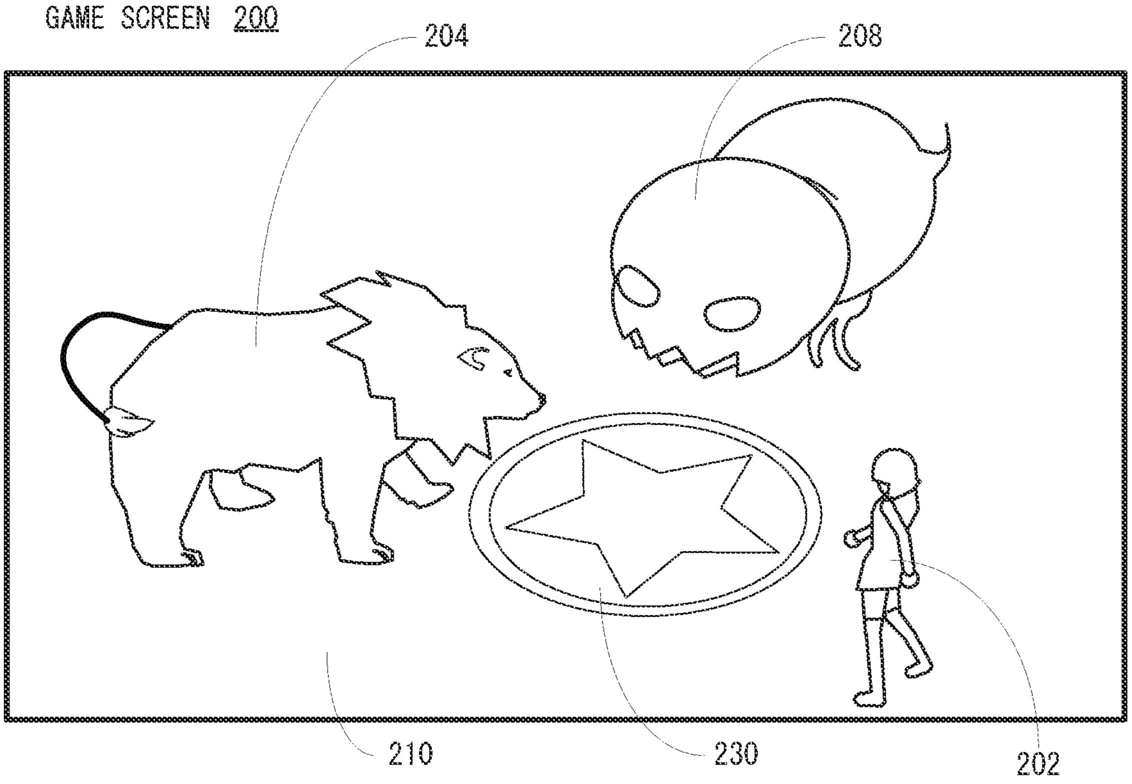
FIG. 13 is a view showing a non-limiting fifth example game screen of the embodiment.
Figure 14A:
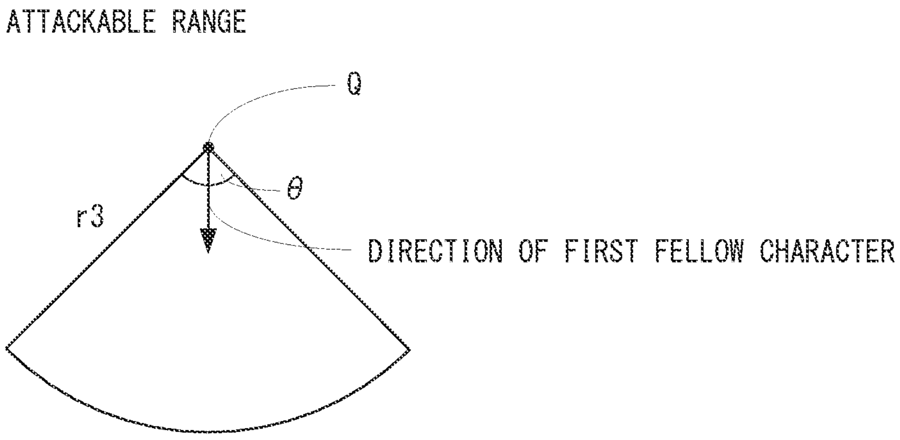
FIG. 14A is a view showing a non-limiting example attackable range for the first fellow character.

A game image shown in FIG. 12 is another non-limiting example game screen 200. Moreover, a game image shown in FIG. 13 is a further non-limiting example game screen 200. In the game screen 200 shown in FIG. 12, the enemy character 208 is included in addition to the player character 202 and the first fellow character 204. As described above, in the separated state, the first fellow character 204 attacks the enemy character 208 according to an operation of the player. However, the first fellow character 204 attacks the enemy character 208 inside the attackable range. In the embodiment, when at least a part of the enemy character 208 is included in the attackable range, the first fellow character 204 can attack the enemy character 208. That is, the attackable range is an effective range for an action that the first fellow character 204 attacks the enemy character 208. As shown in FIG. 14A, the attackable range is defined by a fan shape having a radius of a distance r3 based on a position Q of the first fellow character 204. However, the attackable range is set in a direction that the first fellow character 204 faces. As an example, the distance r3 is three meters in the virtual space, and a central angle theta (θ) is 45 degrees in the virtual space.

Figure 14B:
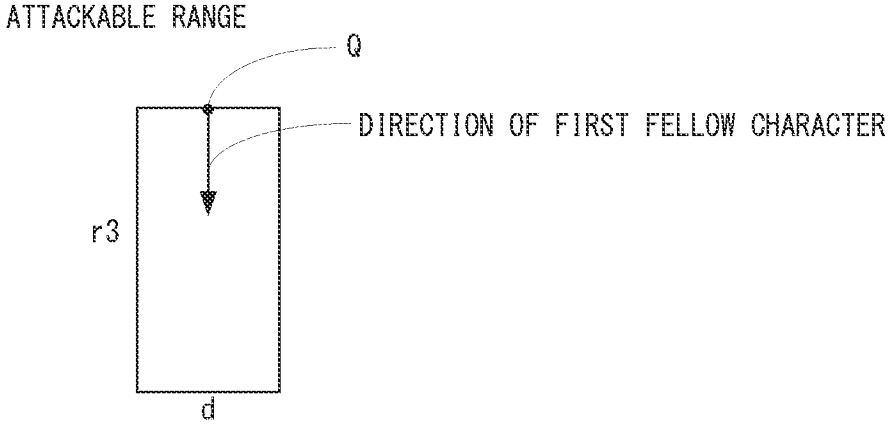
FIG. 14B is a view showing another example attackable range for the first fellow character.

The attackable range shown in FIG. 14A is an example, and as shown in FIG. 14B, it may be defined by a rectangle. The attackable range is defined by the rectangle having a long side is the distance r3 and a short side is a distance d, and the center of one short side is set to the position Q of the first fellow character 204. Moreover, in also this case, the attackable range is set to the direction that the first fellow character 204 faces. As an example, the distance r3 is three meters in the virtual space, and the distance d is one point five meters.

Figure 14C:
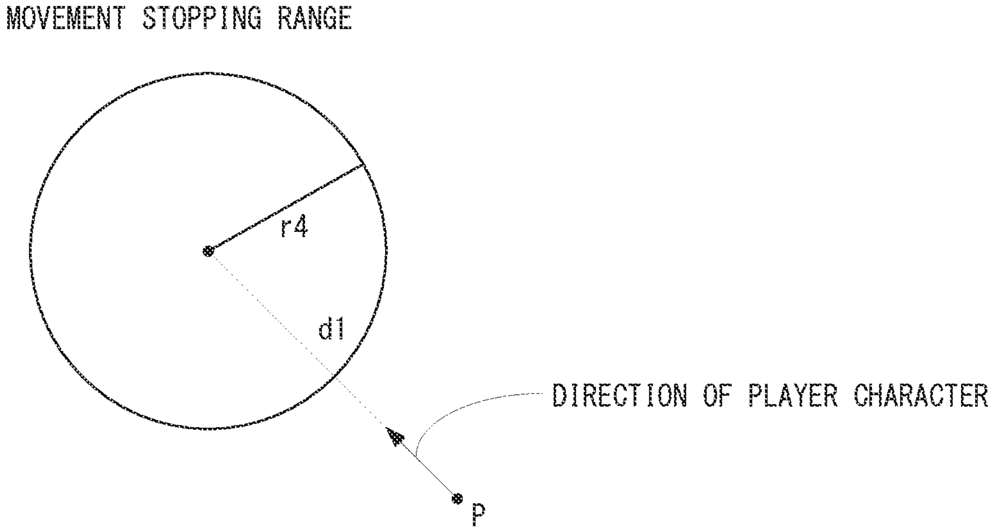
FIG. 14C is a view showing a non-limiting example size of a magic circle that appears in a virtual space and a non-limiting example positional relationship between the magic circle and a player character.

Moreover, in the game screen 200 shown in FIG. 13, a magic circle 230 is further included in the game screen 200 shown in FIG. 12. The magic circle 230 is defined by a circle having a radius of the distance r4, and appears in a predetermined position in front of the direction of the player character 202 based on the position of the player character 202. As shown in FIG. 14C, as an example, the predetermined position is a position in front of the player character 202 only a distance of a half of a distance r4, and the distance r4 is four meters in the virtual space.

Moreover, the magic circle 230 appears according to an operation of the player, and while having appeared, the magic circle 230 is moved gradually toward a position of the enemy character 208 so that the center position of the magic circle 230 is overlapped with the position of the enemy character 208. When the enemy character 208 is located inside the magic circle 230, a movement of the enemy character 208 is stopped by a magic of the player character 202. That is, the magic circle 230 is an effective range of an action for stopping the movement of the enemy character 208. Therefore, the player can stop the movement of the enemy character 208 by operating the player character 202, can attack this enemy character 208 by operating the first fellow character 204.

Thus, by making actions that the player character 202 and the first fellow character 204 can perform actions having different effects against the enemy character 208, it is possible to provide the player with interest of simultaneously controlling two player characters having different roles.

Moreover, there is an occasion that it is difficult to defeat the enemy character 208 while operating two characters individually in a situation that the enemy character 208 that moves exists, by providing to the player character 202 an effect stopping the movement of the enemy character 208 and by providing to the first fellow character 204 an effect attacking the enemy character 208, it becomes possible to approach and attack the enemy character 208 easily. Moreover, if the player can operate both the player character 202 and the first fellow character 204 well, it is possible to more easily defeat the enemy character 208, and thus, interest is increased.

Moreover, by making a size of the magic circle 230 that is an effective range for an action stopping the movement of the enemy character 208 larger than a size of the attackable range that is an effective range for action attacking the enemy character 208, even players who are not good at attacking the enemy character 208 directly, it is easy to play the game because they can attack the enemy character 208 after having stopped once the movement thereof.

Furthermore, in a virtual game that the enemy character 208 is targeted with one hand, it is difficult to target the enemy character 208. Therefore, in the embodiment, the targeting can be assisted by gradually moving the magic circle 230 toward the position of the enemy character 208, and therefore, an operation comfortable for the player is realized.

Furthermore, when the analog stick 32 is operated, the player character 202 is turned and moved to a direction that the analog stick 32 is tilted, and when the analog stick 32 is no longer operated, the player character 202 is stopped in a state of facing the direction of movement. Moreover, by operating the ZL button 39, the player character 202 makes the magic circle 230 appear in a direction that the player character 202 faces, or by operating the analog stick 32 while remaining operating the ZL button 39, the player character 202 is moved while making the magic circle 230 appear, thereby to stop the movement of the enemy character 208 existing inside the magic circle 230.

That is, by operating the ZL button 39 provided (arranged) on a surface that is different from the analog stick 32 that controls the direction of the player character 202, the player character 202 can perform an action according to the direction of the player character 202 (an action stopping the movement of the enemy character 208, in the embodiment), and therefore, it is possible for the player to make the player character 202 perform the action while controlling the direction of the player character 202.

Moreover, if operating the analog stick 52, the first fellow character 204 is turned to a direction that the analog stick 52 is tilted and moved to that direction, when the analog stick 52 is no longer operated, the first fellow character 204 is stopped in a state of facing the direction of movement. Moreover, the first fellow character 204 attacks in the direction that the first fellow character 204 faces by operating the R button 60 or the ZR button 61.

Thus, by operating the ZR button 61 provided on a surface that is different from the analog stick 52 that controls the direction of the first fellow character 204, the first fellow character 204 can perform an action according to the direction of the first fellow character 204 (an action attacking the enemy character 208, in the embodiment), and therefore, it is possible for the player to make the first fellow character 204 perform the action while controlling the direction of the first fellow character 204.

A game image shown in FIG. 15 is another non-limiting example game screen 200. As shown by the game screen 200 of FIG. 9, in the combined state, the second fellow character 206 is in a state of being held by the player character 202 in arms, and if the player operates the analog stick 32, the player character 202 is moved in a direction that the analog stick 32 is tilted, and the second fellow character 206 is moved with the movement of the player character 202. Moreover, in the combined state, if the player operates the analog stick 52, the second fellow character 206 elongates the body in the direction that the analog stick 52 is tilted from the position of the player character 202. Furthermore, if the player operates the ZR button 61 in a state where the second fellow character 206 is being elongated the body, the second fellow character 206 attacks the enemy character 208 as shown in FIG. 15. That is, in the combined state, the attackable range of the second fellow character 206 is defined by a length of the second fellow character 206 being elongated the body.

However, when the second fellow character 206 elongates the body, if an item is arranged near the second fellow character 206, the second fellow character 206 acquires the item. The player can bring the second fellow character 206 that elongates the body close to an item by changing the direction that the analog stick 52 is tilted.

Thus, by operating the ZR button 61 provided on a surface that is different from the analog stick 52 that controls the direction of the second fellow character 206, the second fellow character 206 can perform an action according to the direction of the second fellow character 206 (an action acquiring an item or attacking the enemy character 208, in the embodiment), and therefore, it is possible for the player to make the second fellow character 206 perform the action while controlling the direction of the second fellow character 206.

However, when the second fellow character 206 does not elongate the body, if the player operates the ZR button 61, the second fellow character 206 attacks the enemy character 208 existing in a direction that the player character 202 faces, or acquires an item existing in the direction that the player character 202 faces.

Thus, when the operation state is changed to the combined state from the separated state, the control of movement of the fellow character (204, 206) that is a second player character is to the analog stick 32 changed from the analog stick 52, but the elongation control of the second fellow character 206 that is the second player character can be continuously performed using the analog stick 52, and therefore, the player can operate the analog stick 52 intuitively.

Moreover, in either the separated state or the combined state, if the right direction button 33, the down direction button 34, the up direction button 35 or the left direction button 36 is operated, an item according to the operated operation button 33-36 is used. When using an item, an effect according to the item is activated. As an example, a part or all of the hit point (HP) of the player character 202 is recovered, a part or all of hit point (HP) of the first fellow character 204 or the second fellow character 206 is recovered, a blast wave from a bombing spread over a predetermined range centering on the player character 202, or lightning strikes a predetermined range centering on the player character 202. If bombing (or blast wave) or lightning hits the enemy character 208, it is possible to attack the enemy character 208.

Similarly, in either the separated state or the combined state, if the A button 53, the B button 54, the X button 55 or the Y button 56 is operated, the attribute according to the operated operation button 53-56 is set as the attribute of the first fellow character 204. In the embodiment, the operation buttons 53, 54, 55 and 56 are assigned with a water attribute, a fire attribute, a grass attribute and an electricity attribute, respectively. The attribute of the first fellow character 204 is set as a normal attribute at the start of the virtual game, and if the operation button 54-56 is operated, an attribute assigned to the operated operation button 53-56 is set, and if the operation button 53-56 to which the current attribute is assigned is further operated, the normal attribute will be set.

In addition, effect ranges of the actions performed by an operation of the operation button 33-36 and the operation button 53-56, i.e., effect ranges of the use of item and the change of attribute are not based on the directions of the player character 202, the first fellow character 204 and the second fellow character 206.

However, if the attribute is changed during an attack by the first fellow character 204, after ending the attack, an action according to the attribute after change (in the embodiment, an attack according to the attribute after change) will be performed. In the embodiment, during an attack by the first fellow character 204 means a time period that the first fellow character 204 is performing an attack, or a time period for few or several seconds after starting the attack. However, the attack is an action according to the direction of the first fellow character 204.

Since the analog stick 52 that makes the first fellow character 204 move (or change its direction), and the R button 60 and the ZR button 61 that make the first fellow character 204 perform an attack are provided in different surfaces, it is possible for the player to attack the enemy character 208 while controlling the direction of the first fellow character 204. That is, since during an attack, the player makes the first fellow character 204 turn to a direction to attack the enemy character 208, even if the operation button 53-56 provided in the same surface as the analog stick 52 is operated, it is possible to make the first fellow character 204 perform an attack according to the direction thereof.

Moreover, if the attribute is changed during the attack by the first fellow character 204, an effect according to an attribute after change may be applied. Furthermore, if the attribute is changed during the attack by the first fellow character 204, the attack may be canceled and an action according to an attribute after change (in the embodiment, an attack according to an attribute after change) may be performed.

Figure 16:
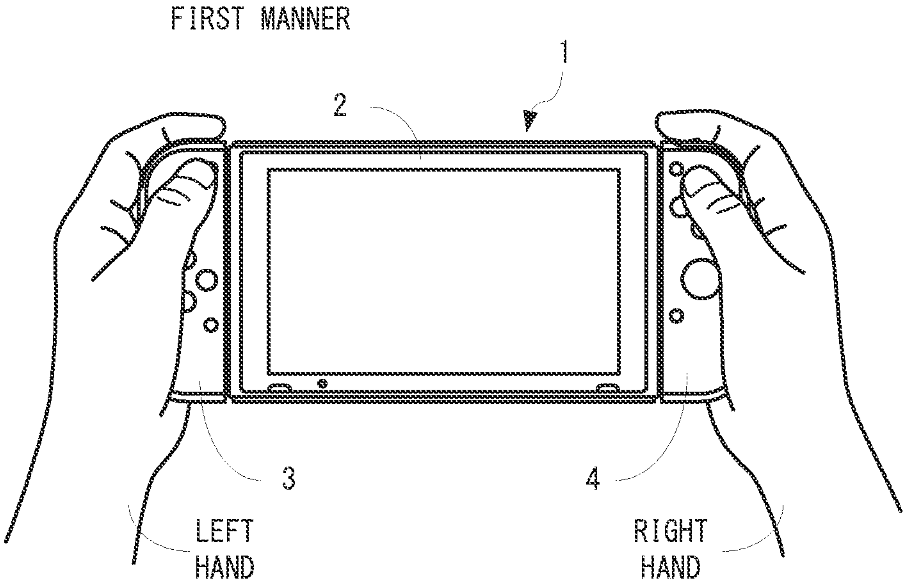
FIG. 16 is a view showing a non-limiting example usage manner of the game system shown in FIG. 1.

FIG. 16 is a view showing a non-limiting example usage manner (first manner) of the game system 1. As shown in FIG. 16, in the game system 1 of the first manner, the left controller 3 and the right controller 4 are used in a state of being attached to the main body apparatus 2. In this case, the player holds the game system 1 with both hands, and operates the left controller 3 with the left hand and the right controller 4 with the right hand.

Figure 17:
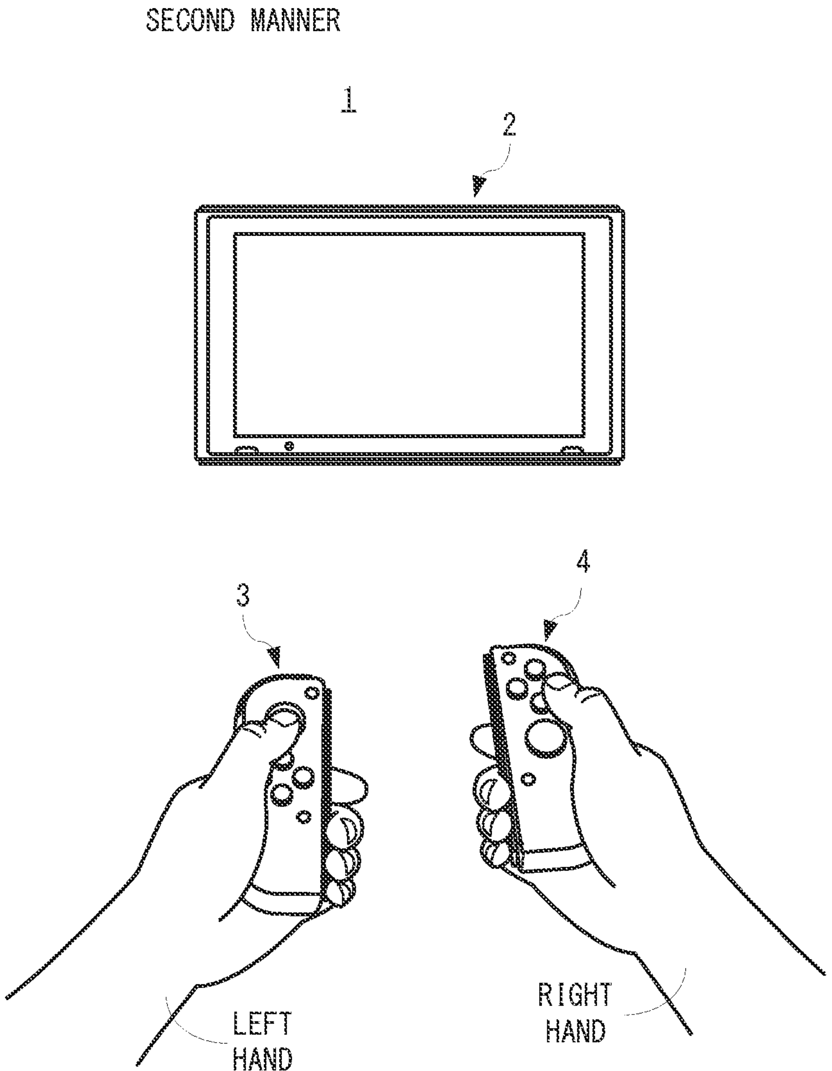
FIG. 17 is a view showing another non-limiting example usage manner of the game system shown in FIG. 1.

FIG. 17 is a view showing another non-limiting example usage manner (second manner) of the game system 1. As shown in FIG. 17, in the game system 1 of the second manner, the left controller 3 and the right controller 4 are used in a state of being detached from the main body apparatus 2. In this case, the player holds the left controller 3 with the left hand and holds the right controller 4 with the right hand, and the main body apparatus 2 is put on a desk or stand in an upright state. However, the upright state of the main body apparatus 2 means a state where the display surface of the display 12 provided on the main body apparatus 2 is vertical to the horizontal plane or slightly inclined from vertical.

Figure 18:
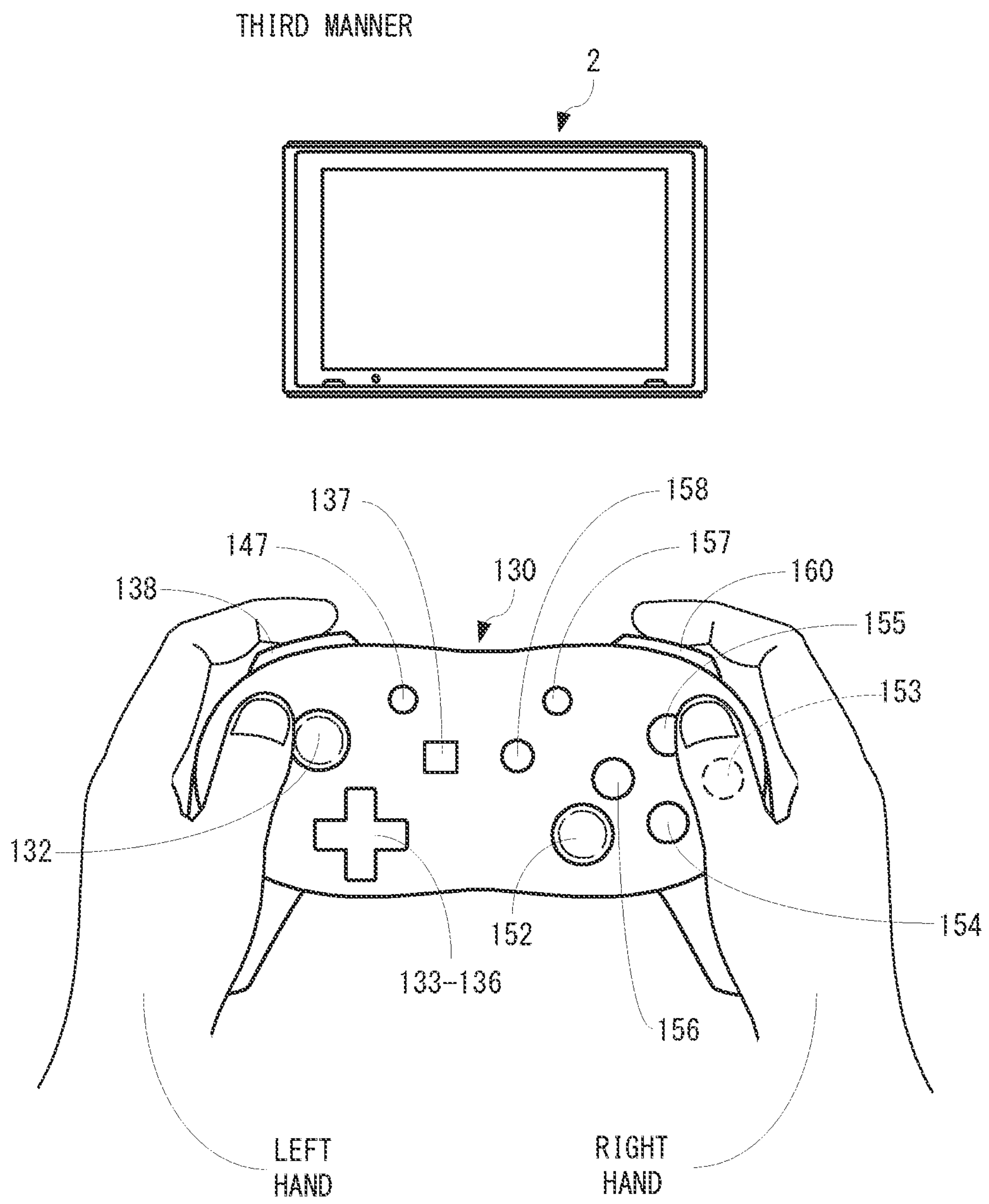
FIG. 18 is a view showing a further non-limiting example usage manner of the game system shown in FIG. 1.

FIG. 18 is a view showing a further non-limiting example usage manner (third manner) of the game system 1. As shown in FIG. 18, in the game system 1 of the third manner, instead of the left controller 3 and the right controller 4, another controller 130 is used. In this case, the game system 1 is constituted by the main body apparatus 2 and the controller 130.

In addition, although the left controller 3 and the right controller 4 are separated from the main body apparatus 2 in an example shown in FIG. 18, when not using the left controller 3 and the right controller 4, these may be in a state of being attached to the main body apparatus 2.

In the third manner, the player holds and operates the controller 130 with both hands. Moreover, similar to the second manner, the main body apparatus 2 is put on a desk or stand in an upright state.

The controller 130 is provided with an analog stick 132 that is the same or similar to the analog stick 32 provided on the left controller 3, and various kinds of operation buttons 133-139 and 147 that are the same or similar to the various kinds of operation buttons (33-39 and 47). That is, on a left holding portion of the controller 130, a cross button that are constituted with the analog stick 132, a right direction button 133, a down direction button 134, an up direction button 135 and a left direction button 136, a recording button 137, an L button 138, a ZL button 139 and a minus button 147 are provided. However, although omitted in FIG. 18, the ZL button 139 is provided on a back side of the L button 138 like a positional relationship between the L button 38 and the ZL button 39 shown in FIG. 4.

Moreover, the controller 130 is provided with an analog stick 152 that is the same or similar to the analog stick 52 provided on the right controller 4, and a various kinds of operation buttons 153-158, 160 and 161 that are the same or similar to the various kinds of operation buttons (53-58, 60 and 61) provided on the right controller 4. That is, on the right holding portion of the controller 130, the analog stick 152, an A button 153, a B button 154, an X button 155, a Y button 156, a plus button 157, a home button 158, an R button 160 and a ZR button 161 are provided. However, although omitted in FIG. 18, the ZR button 161 is provided on a back side of the R button 160 like a positional relationship between the R button 60 and the ZR button 61 shown in FIG. 5.

To the analog sticks 132 and 152 and the various kinds of operation buttons 133-139, 147, 153-158, 160 and 161 all provided on the controller 130 are assigned with the same or similar functions to those of the analog sticks 32 and 52, the various kinds of operation buttons 33-39, 47, 53-58, 60 and 61 that are provided on the left controller 3 and the right controller 4.

As shown in FIG. 16 and FIG. 17, in using the game system 1 of the embodiment shown in FIG. 1-FIG. 5, the left controller 3 corresponds to a side of the left holding portion of an operation device, and the right controller 4 corresponds to a side of the right holding portion of the operation device.

Moreover, as shown in FIG. 16 and FIG. 17, usually, the player operates, with the left thumb, the analog stick 32 and the operation buttons 33-36 provided on a main surface of the housing 31, and operates, with the left index finger, the L button 38 and the ZL button 39 provided on an upper portion of a left side surface of the housing 31. Moreover, the player operates, with the right thumb, the analog stick 52 and the operation buttons 53-56 provided on a main surface of the housing 51, and operates, with the right index finger, the R button 60 and the ZR button 61 provided on an upper portion of a right side surface of the housing 51.

Therefore, as described above, it is possible to operate the L button 38 or the ZL button 39 provided on a surface different the analog stick 32 with the left index finger while operating this analog stick 32 with the left thumb. Similarly, it is possible to operate the R button 60 or the ZR button 61 provided on a surface different from the analog stick 52 with the right index finger while operating this analog stick 52 with the right thumb.

As shown in FIG. 18, a left side from the center in the left and right direction of the controller 130 corresponds to a side of the left holding portion of an operation device, and a right side from the center in the left and right direction of the controller 130 corresponds to a side of the right holding portion of the operation device.

Moreover, as shown in FIG. 18, usually, the player operates, with the left thumb, the analog stick 132 and the operation buttons 133-136 (i.e., cross button) provided on a main surface of the housing of the controller 130, and operates, with the left index finger, the L button 138 and the ZL button 139 provided on an upper portion of a left side surface of the housing of the controller 130. Moreover, the player operates, with the right thumb, the analog stick 152 and the operation buttons 153-156 provided on the main surface of the housing of the controller 130, and operates, with the right index finger, the R button 160 and the ZR button 161 provided on an upper portion of a right side surface of the housing of the controller 130.

Therefore, also in the controller 130, it is possible to operate the L button 138 or the ZL button 139 provided on a surface different from the analog stick 132 with the left index finger while operating the analog stick 132 with the left thumb. Similarly, it is possible to operate the R button 160 or the ZR button 161 provided on a surface different from the analog stick 152 with the right index finger while operating the analog stick 152 with the right thumb.

Figure 19:
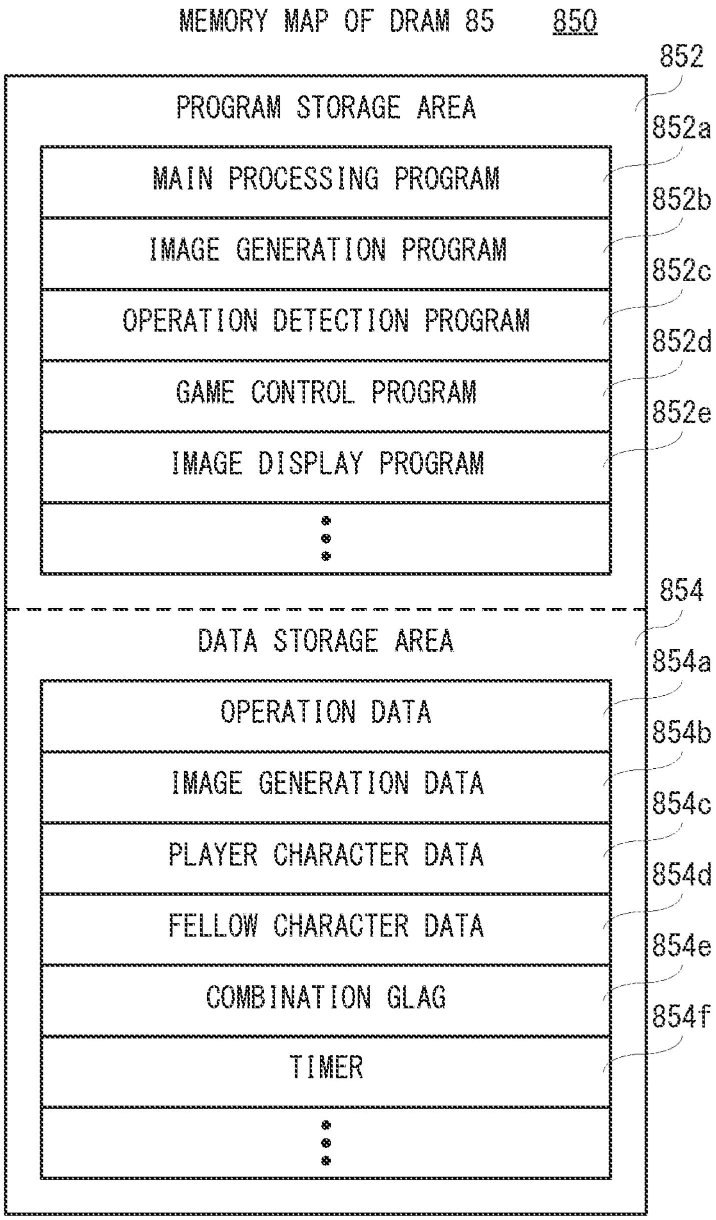
FIG. 19 is a view showing a non-limiting example memory map of a DRAM of the main body apparatus shown in FIG. 6.

FIG. 19 is a view showing a non-limiting example memory map 850 of the DRAM 85 shown in FIG. 6. As shown in FIG. 19, the DRAM 85 includes a program storage area 852 and a data storage area 854. The program storage area 852 is stored with a program of game application (i.e., game program). As shown in FIG. 19, the game program includes a main processing program 852*a*, an image generation program 852*b*, an operation detection program 852*c*, a game control program 852*d*, an image display program 852*e*, etc. However, a function of displaying images such as a game image is a function that the main body apparatus 2 is provided with. Therefore, the image display program 852*e* is also not included in the game program.

Although a detailed description is omitted, at a proper timing after a power of the main body apparatus 2 is turned on, a part or all of each of the programs 852*a*-852*e* is read from the flash memory 84 and/or a storage medium attached to the slot 23 to be stored in the DRAM 85. However, a part or all of each of the programs 852*a*-852*e* may be acquired from other computers capable of performing communication with the main body apparatus 2.

The main processing program 852*a* is a program for executing overall game processing (hereinafter, referred to as "overall processing") of a virtual game of this embodiment.

The image generation program 852*b* is a program for generating, using image generation data 854*b* described later, display image data corresponding to various kinds of images such as a game image. The game image includes the player character 202, the fellow character (204 or 206) and background object 210, and may further include the enemy character 208 and the magic circle 230.

The operation detection program 852*c* is a program for acquiring the operation data 854*a* from the left controller 3 and/or the right controller 4. Moreover, when one or more other controllers (e.g., controller 130) are used, the operation detection program 852*c* also acquires the operation data 854*a* from the one or more controllers.

The game control program 852*d* is a program for executing game control processing for the virtual game. The game control processing includes making the player character 202 perform an arbitrary action or operation according to an operation of the player, making the non-player character perform an arbitrary action or operation irrespective of an operation of the player, etc. However, in the game control processing, there is an occasion that the position and the direction of the player character 202 are changed according to the progress of the virtual game irrespective of an operation of the player.

The image display program 852*e* is a program for outputting to a display device the display image data generated according to the image generation program 852*b*. Therefore, images corresponding to the display image data (game screen 200, etc.) are displayed on the display device such as the display 12.

In addition, the program storage area 852 is further stored with a sound output program for outputting a sound such as a BGM, etc., a communication program for performing communication with other apparatuses, a backup program for storing data in a nonvolatile storage medium such as the flash memory 84, etc.

Moreover, the data storage area 854 is stored with the operation data 854*a*, the image generation data 854*b*, player character data 854*c*, fellow character data 854*d*, etc. Moreover, a combination flag 854*e* and a timer 854*f* are provided in the data storage area 854.

The operation data 854*a* is operation data received from the left controller 3 and/or the right controller 4. In the embodiment, when the main body apparatus 2 receives the operation data from both of the left controller 3 and the right controller 4, the main body apparatus 2 stores the operation data 854*a* while making the left controller 3 and the right controller 4 be identifiable. Moreover, when one or more further controllers (e.g., controller 130) are used, the main body apparatus 2 stores the operation data 854*a* while making the one or more further controllers be identifiable.

The image generation data 854*d* is data required for generating the display image data, such as polygon data and texture data.

The player character data 854*c* includes current position data, direction data and item data of the player character 202. The current position data includes data of a current position of the player character 202 in the virtual space i.e., three-dimensional coordinates data. The direction data includes data of a current direction of the player character 202 in the virtual space. The item data includes data of a kind of item and the number of items that the player character 202 possesses.

The fellow character data 854*d* includes current position data, direction data, attribute data and an elongation flag of the first fellow character 204 or the second fellow character 206. The current position data includes data of a current position of the first fellow character 204 or the second fellow character 206 in the virtual space i.e., three-dimensional coordinates data. The direction data includes data of a current direction of the first fellow character 204 or the second fellow character 206 in the virtual space. The attribute data is data of a current attribute of the first fellow character 204 in the virtual space. The elongation flag is a flag indicating whether the second fellow character 206 is elongated. When the second fellow character 206 is elongated, the elongation flag is turned on, and the elongation flag is turned off when the second fellow character 206 is not elongated.

The combination flag 854*e* is a flag indicating whether the player character 202 and the fellow character (204 or 206) are in the combined state. When the player character 202 and the fellow character are in the combined state, the combination flag 854*e* is turned on. On the other hand, when the player character 202 and the fellow character are in the separated state, the combination flag 854*e* is turned off.

The timer 854*f* is a timer for counting a time period that the player character 202 and the first fellow character 204 are in the separated state and the distance between characters exceeds the distance r2.

Although illustration is omitted, the data storage area 854 is stored with other data of the non-player character and the background object that are arranged in the virtual space, and is provided with other flags and timers (or counters).

Figure 20:
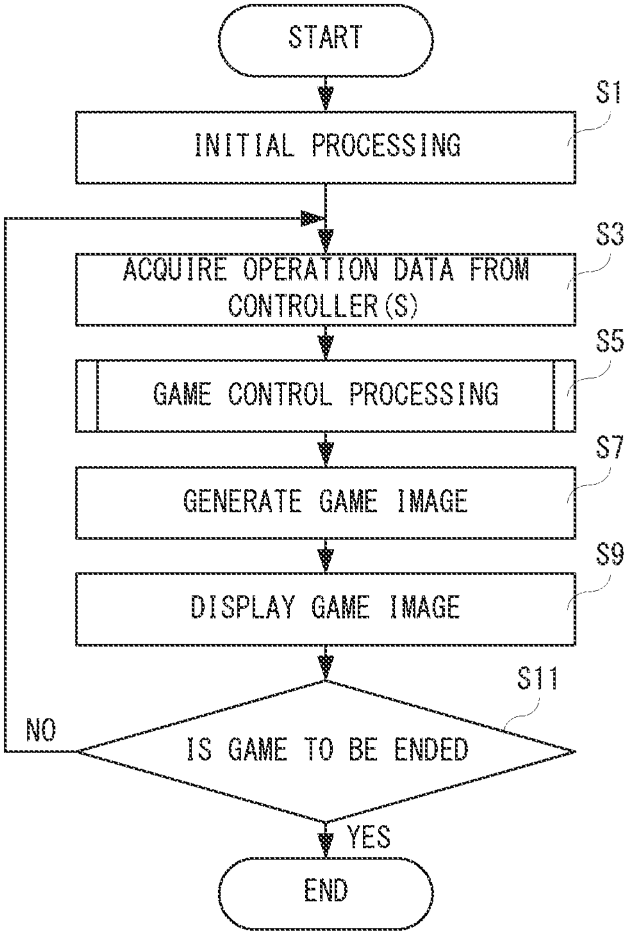
FIG. 20 is a flowchart showing non-limiting example overall processing of a processor(s) of the main body apparatus shown in FIG. 6.

FIG. 20 is a flowchart showing non-limiting example processing of the game program (overall processing) by the processor 81 (or computer) of the main body apparatus 2. FIG. 21-FIG. 26 are flowcharts showing non-limiting example game control processing of the processor 81 of the main body apparatus 2. In the following, the overall processing and the game control processing will be described using FIG. 20-FIG. 26.

However, processing of respective steps of the flowcharts shown in FIG. 20-FIG. 26 are mere examples, and if the same or similar result is obtainable, an order of the respective steps may be exchanged. Moreover, in the embodiment, it will be described that the processing of the respective steps of the flowcharts shown in FIG. 20-FIG. 26 are basically executed by the processor 81; however, some steps may be executed by a processor(s) and/or a dedicated circuit(s) other than the processor 81.

When the power of the main body apparatus 2 is turned on, prior to execution of the overall processing, the processor 81 executes a boot program stored in a boot ROM not shown, whereby respective units including the DRAM 85, etc. are initialized. When the execution of the game program of the embodiment is instructed by the player, the main body apparatus 2 will start the overall processing.

As shown in FIG. 20, if the overall processing is started, the processor 81 executes initial setting in a step S1. Here, the processor 81 determines positions and directions that the player character 202, the fellow character (in the embodiment, second fellow character 206), the non-player character including the enemy character 208 and the background object 210 are to be arranged as initial positions and initial directions in the virtual space. However, in starting the virtual game from where the player left off, the positions and the directions that the player character 202, the fellow character (204 or 206), the non-player character including the enemy character 208 and the background object 210 are to be arranged are determined as the positions and the directions at the time of being saved. Therefore, the player character data 854*c* in which the initial position and the initial direction or the position and the direction at the time of being saved of the player character 202 are set as the current position data and the current direction data are stored in the data storage area 854. Moreover, the fellow character data 854*d* in which the initial position and the initial direction or the position and the direction at the time of being saved of the fellow character (first fellow character 204 or second fellow character 206) are set as the current position data and the current direction data are stored in the data storage area 854.

Moreover, although the combination flag 854*e* is turned off at the time of the start of the overall processing, when starting the virtual game from where the player left off last time, the combination flag 854*e* is turned on or off depending on a state at the time of being saved.

In a subsequent step S3, the operation data transmitted from the left controller 3 and/or the right controller 4 is acquired, and in a step S5, the game control processing described later is executed (see FIG. 21-FIG. 26).

In a next step S7, the game image (i.e., display image) is generated. Here, the processor 81 generates a certain sight or situation (scene) by arranging in the three-dimensional virtual space various kinds of objects and characters based on a result of the game control processing in the step S5 to generate the game image data corresponding to the game image (game screen 200, etc.) that the generated scene is shot by the virtual camera.

In a next step S9, the game image is displayed. Here, the processor 81 outputs the game image data generated in the step S7 to the display 12

Then, in a step S11, it is determined whether the game is to be ended. The determination in the step S11 is performed based on whether the player issues an instruction to end the game. If "NO" is determined in the step S11, that is, if the game is not to be ended, the process returns to the step S3. On the other hand, if "YES" is determined in the step S11, that is, if the game is to be ended, the overall processing is terminated.

Figure 21:
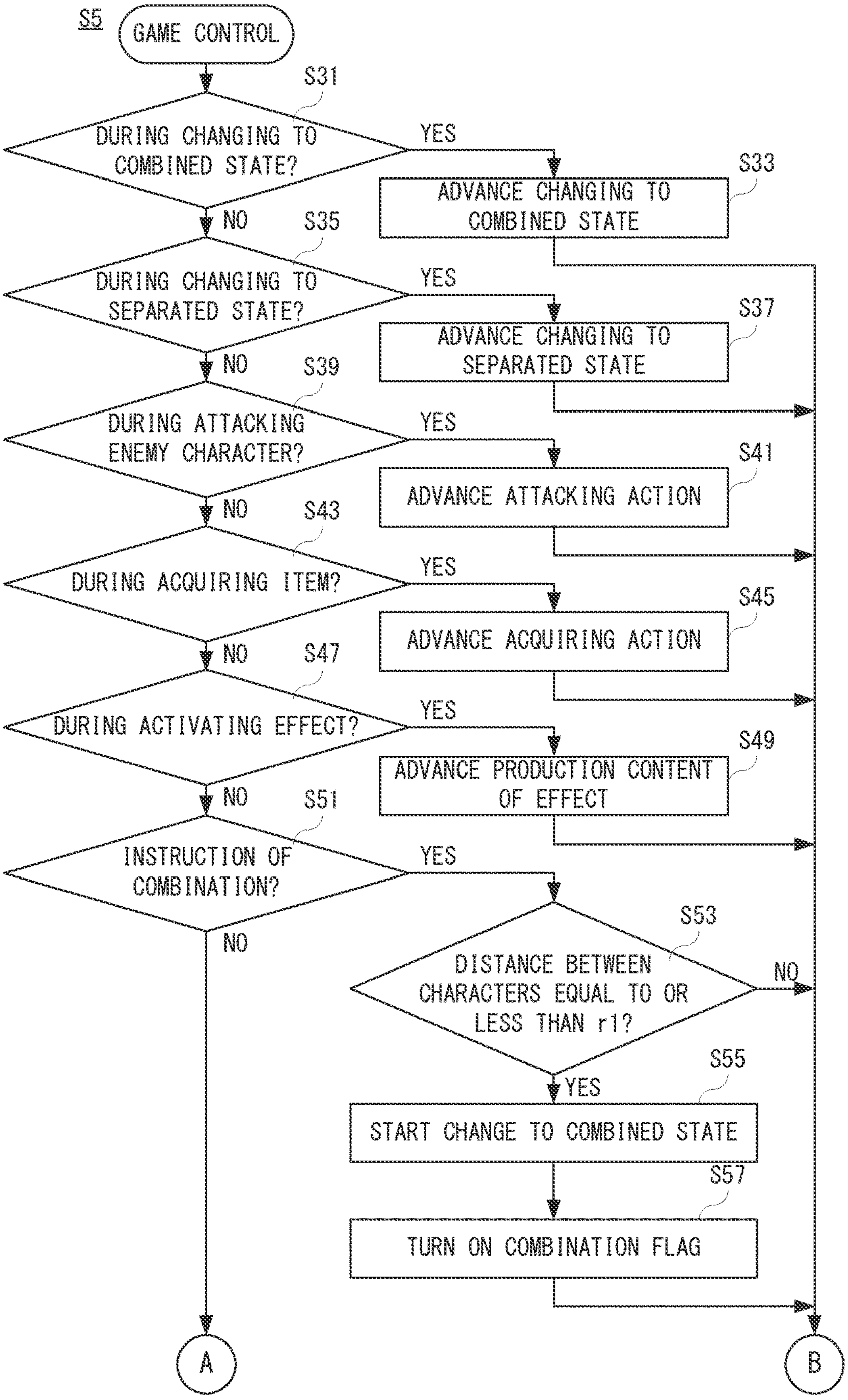
FIG. 21 is a flowchart showing a first part of non-limiting example game control processing of the processor(s) of the main body apparatus shown in FIG. 6.

As shown in FIG. 21, if the game control processing shown in step S5 is started, the processor 81 determines, in a step S31, whether the operation state is during a change to the combined state from the separated state. If "YES" is determined in the step S31, that is, if the operation state is during a change to the combined state from the separated state, the change to the combined state is advanced in a step S33, and the process proceeds to a step S127 shown in FIG. 26. When the operation state is changed from the separated state to the combined state, the first fellow character 204 is changed to the second fellow character 206, and the second fellow character 206 is held by player character 202 in arms.

If "NO" is determined in the step S31, that is, if the operation state is not during a change to the combined state from the separated state, it is determined, in a step S35, whether the operation state is during a change to the separated state from the combined state. If "YES" is determined in the step S35, that is, if the operation state is during a change to the separated state from the combined state, the change to the separated state is advanced in a step S37, and the process proceeds to the step S127. When the operation state is changed from the combined state to the separated state, the second fellow character 206 is separated from the player character 202, and the second fellow character 206 is changed to the first fellow character 204. At this time, the first fellow character 204 is arranged immediately next to the player character 202.

If "NO" is determined in the step S35, that is, if the operation state is not during a change to the separated state from the combined state, it is determined, in a step S39, whether the first fellow character 204 or the second fellow character 206 is during attacking the enemy character 208. If "YES" is determined in the step S39, that is, if the first fellow character 204 or the second fellow character 206 is during attacking the enemy character 208, an attacking action of the first fellow character 204 or the second fellow character 206 is advanced in a step S41, and then, the process proceeds to the step S127.

If "NO" is determined in the step S39, that is, if the first fellow character 204 or the second fellow character 206 is not during attacking the enemy character 208, it is determined, in a step S43, whether the second fellow character 206 is during acquiring an item. If "YES" is determined in the step S43, that is, if the second fellow character 206 is during acquiring an item, an operation that the second fellow character 206 acquires an item is advanced in a step S45, and the process proceeds to the step S127. When the second fellow character 206 acquires an item, the item data of the player character data 854*c* is updated. That is, the number of the acquired items is increased.

If "NO" is determined in the step S43, that is, if the second fellow character 206 is not during acquiring an item, it is determine, in a step S47, whether it is during activating an effect. If "YES" is determined in the step S47, that is, if it is during activating an effect, the production content of an effect is advanced in a step S49, and the process proceeds to the step S127. In the step S49, a manner that a part or all of the hit point (HP) of the player character 202 is recovered is represented, a manner that a part or all of the hit point (HP) of the first fellow character 204 or the second fellow character 206 is recovered is represented, a manner that a blast wave from a bombing spread over a predetermined range centering on the player character 202 is represented, or a manner that lightning strikes a predetermined range centering on the player character 202 is represented.

If "NO" is determined in the step S47, that is, if it is not during activating an effect, it is determined, in a step S51, whether there is an instruction of combination. Here, the processor 81 determines whether the combination flag 854*e* is turned off, and whether the operation data acquired in the step S3 includes the operation data indicating an operation of the L button 38. However, when the combination flag 854*e* is turned on, steps S53-S57 are skipped, and the process proceeds to the step S127.

If "YES" is determined in the step S51, that is, if there is an instruction of combination, it is determined, in a step S53, whether the distance between characters is equal to or less than the distance r1. If "NO" is determined in the step S53, that is, if the distance between characters exceeds the distance r1, the process proceeds to the step S127. On the other hand, if "YES" is determined in the step S53, that is, if the distance between characters is equal to or less than the distance r1, a change to the combined state from the separated state is started in a step S55, and the combination flag 854*e* is turned on in a step S57, and then, the process proceeds to the step S127.

Figure 22:
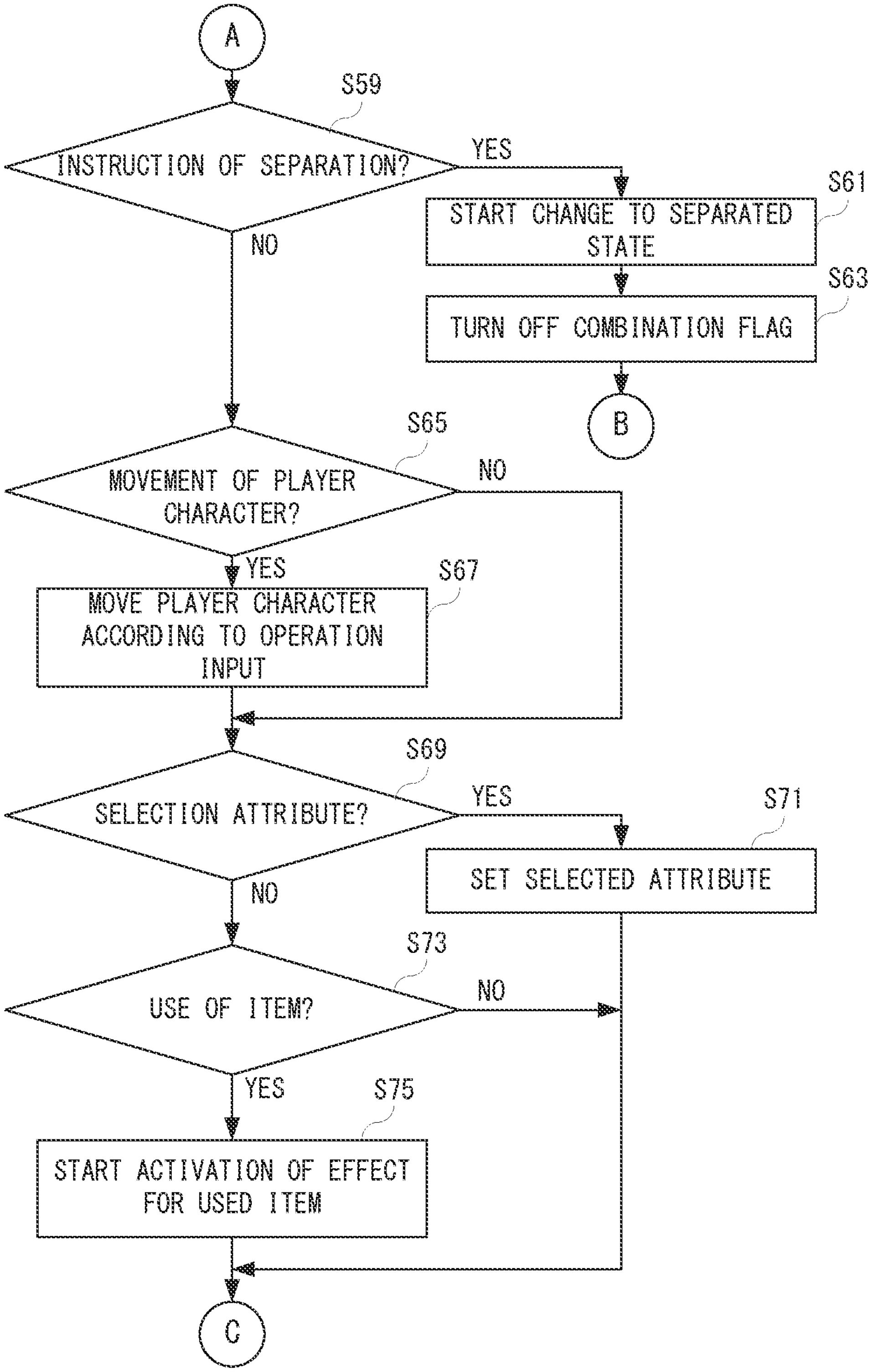
FIG. 22 is a flowchart showing a second part of the non-limiting example game control processing of the processor(s) of the main body apparatus shown in FIG. 6, following FIG. 21.

If "NO" is determined in the step S51, that is, if there is not an instruction of combination, it is determined, in a step S59 shown in FIG. 22, there is an instruction of separation. Here, the processor 81 determines whether the combination flag 854*e* is turned on, and whether the operation data acquired in the step S3 includes the operation data indicating an operation of the R button 60. However, when the combination flag 854*e* is turned off, steps S61-S63 are skipped, and the process proceeds to the step S127.

If "YES" is determined in the step S59, that is, if there is an instruction of separation, a change to the separated state from the combined state is started in a step S61, and the combination flag 854*e* is turned off in a step S63, and then, the process proceeds to the step S127. On the other hand, if "NO" is determined in the step S59, that is, if there is not an instruction of separation, it is determined, in a step S65, whether it is a movement of the player character 202. Here, the processor 81 determines whether the operation data acquired in the step S3 includes the operation data indicating an operation of the analog stick 32.

If "YES" is determined in the step S65, that is, if it is a movement of the player character 202, the player character 202 is moved according to an operation input in a step S67, and the process proceeds to a step S69. In the step S67, the processor 81 changes the position and the direction of the player character 202 to a direction according to an operation of the analog stick 32. That is, the current position data and the current direction data of the player character 202 are updated. However, when the magic circle 230 appears, the player character 202 and the magic circle 230 are moved while maintaining the direction of the player character 202 and the positional relationship between the player character 202 and the magic circle 230 at the time of the ZL button 39 is operated first. Moreover, although illustration is omitted, when the second fellow character 206 is combined with the player character 202, the current position and the current direction of the second fellow character 206 are changed with a change of the current position and the current direction of the player character 202. That is, the current position data and the current direction data included in the fellow character data 854*d* are updated. Furthermore, although illustration is omitted, when the player character 202 approaches or arrives at a position of an item, acquiring the item. When the player character 202 acquires an item, the item data of the player character data 854*c* is updated.

On the other hand, if "NO" is determined in the step S65, that is, if it is not a movement of the player character 202, it is determined, in a step S69, whether it is selection of an attribute. Here, the processor 81 determines whether the operation data acquired in the step S3 includes the operation data indicating an operation of the A button 53, the B button 54, the X button 55 or the Y button 56.

Figure 23:
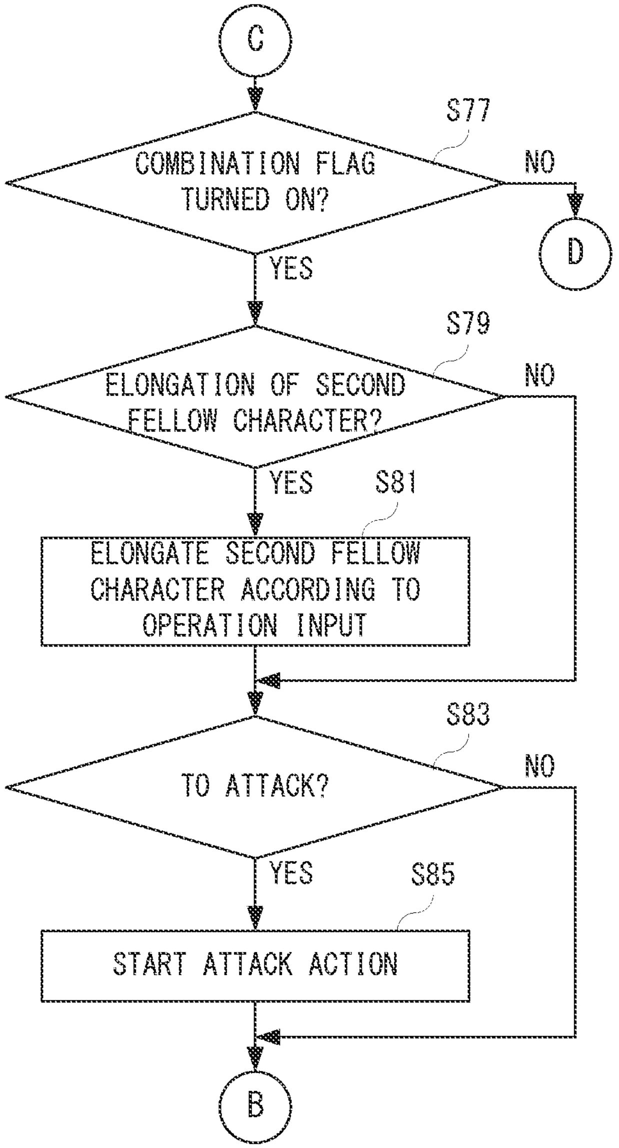
FIG. 23 is a flowchart showing a third part of the non-limiting example game control processing of the processor(s) of the main body apparatus shown in FIG. 6, following FIG. 22.

If "YES" is determined in the step S69, that is, if it is selection of an attribute, in a step S71, the attribute of the fellow character (204 or 206) is changed to the selected attribute, and the process proceeds to a step S77 shown in FIG. 23. However, in the step S71, when the operation button 33-36 that indicates the same attribute as the current attribute is operated, the attribute is returned to the normal attribute. On the other hand, if "NO" is determined in the step S69, that is, it is not selection of an attribute, it is determined, in a step S73, whether it is use of an item. Here, the processor 81 determines whether the operation data acquired in the step S3 includes the operation data indicating an operation of the right direction button 33, the down direction button 34, the up direction button 35 or the left direction button 36.

If "YES" is determined in the step S73, that is, if it is use of an item, an effect of the used item is activated in a step S75, and the process proceeds to the step S77. When the player character 202 uses an item, the item data of the player character data 854*c* is updated. That is, the number of the used items is decreased. On the other hand, if "NO" is determined in the step S73, that is, if it is not a use of an item, the process proceeds to the step S77.

In the step S77 shown in FIG. 23, it is determined whether the combination flag 854*e* is turned on. If "NO" is determined in the step S77, that is, if the combination flag 854*e* is turned off, the process proceeds to a step S87 shown in FIG. 24. On the other hand, if "YES" is determined in the step S77, that is, if the combination flag 854*e* is turned on, it is determined, in a step S79, whether it is an elongation of the second fellow character 206. Here, the processor 81 determines whether the operation data acquired in the step S3 includes the operation data indicating an operation of the analog stick 52.

If "YES" is determined in the step S79, that is, if it is an elongation of the second fellow character 206, in a step S81, the second fellow character 206 is elongated according to an operation input by only a predetermined length, and the process proceed to the step S127. In the step S81, the processor 81 updates the direction data included in the fellow character data 854*d*, and turns on the elongation flag. Moreover, although illustration is omitted, when the second fellow character 206 approaches or arrives at a position of an item, acquiring the item. When the second fellow character 206 acquires an item, the item data of the player character data 854*c* is updated.

Moreover, if "NO" is determined in the step S79, that is, if it is not an elongation of the second fellow character 206, it is determined, in a step S83, whether an attack is to be performed. Here, the processor 81 determines whether the operation data acquired in the step S3 includes the operation data indicating an operation of the ZR button 61. However, in a case where the second fellow character 206 has been elongated, that is, in a case where the elongation flag included in the fellow character data 854*d* is turned on, if "NO" is determined in the step S79, the second fellow character 206 is returned to its original length. That is, the elongation flag included in the fellow character data 854*d* is turned off.

If "NO" is determined in the step S83, that is, if an attack is not to be performed, the process proceeds to the step S127. On the other hand, if "YES" is determined in the step S83, that is, if an attack is to be performed, an attack action is started in a step S85, and the process proceeds to the step S127. When the second fellow character 206 is being elongated, in a step S85, an attack action is started in an elongated direction. However, if an attack is instructed when the second fellow character 206 is not elongated, in the step S85, the second fellow character 206 starts an attack action in a direction that the player character 202 faces.

Figure 24:
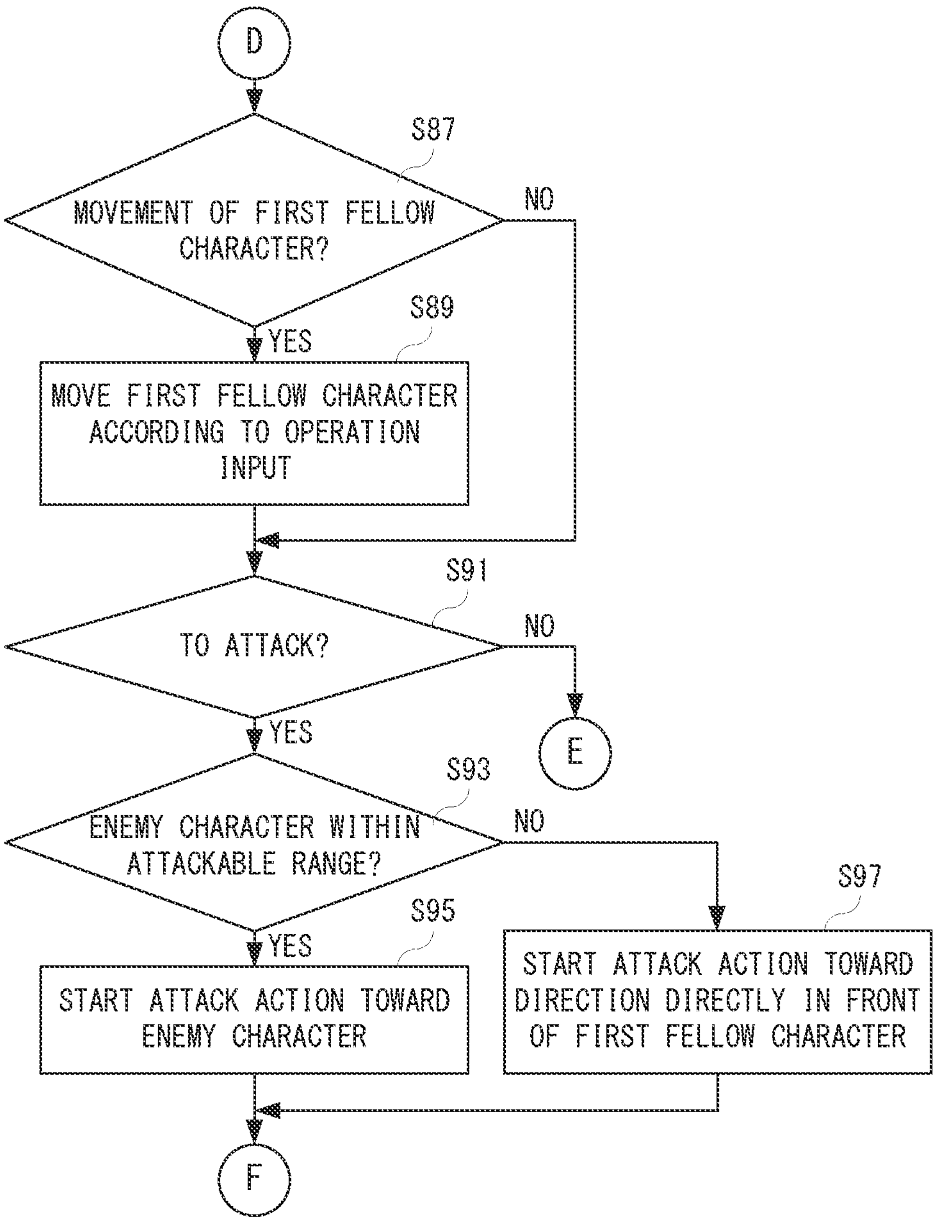
FIG. 24 is a flowchart showing a fourth part of the non-limiting example game control processing of the processor(s) of the main body apparatus shown in FIG. 6, following FIG. 23.

In the step S87 shown in FIG. 24, it is determined whether it is a movement of the first fellow character 204. Here, the processor 81 determines whether the operation data acquired in the step S3 includes the operation data indicating an operation of the analog stick 52.

If "YES" is determined in the step S87, that is, if it is a movement of the first fellow character 204, the first fellow character 204 is moved according to an operation input in a step S89, and the process proceeds to a step S91. In the step S89, the processor 81 changes the position and the direction of the first fellow character 204 to a direction according to an operation of the analog stick 52. That is, the current position data and the current direction data included in the fellow character data 854*d* are updated. Although illustration is omitted, when the first fellow character 204 approaches or arrives at a position of an item, acquiring the item.

On the other hand, if "NO" is determined in the step S87, that is, if it is not a movement of the first fellow character 204, it is determined, in the step S91, whether an attack is to be performed. Here, the processor 81 determines whether the operation data acquired in the step S3 includes the operation data indicating an operation of the R button 60 or the ZR button 61.

If "YES" is determined in the step S91, that is, if an attack is to be performed, it is determined, in a step S93, whether the enemy character 208 is within the attackable range for the first fellow character 204.

If "YES" is determined in the step S93, that is, if the enemy character 208 is within the attackable range of the first fellow character 204, in a step S95, an attack action of the first fellow character 204 toward the enemy character 208 is started, and the process proceeds to the step S127. On the other hand, if "NO" is determined in the step S93, that is, if the enemy character 208 is out of the attackable range of the first fellow character 204, in a step S97, an attack action of the first fellow character 204 toward a direction directly in front of the first fellow character 204 is started, and the process proceeds to the step S127. However, an attack operation according to the attribute of the first fellow character 204 is started in the step S95 and the step S97 when the R button 60 is operated, and when the ZR button 61 is operated, a bite action or a scratch action of the first fellow character 204 is started in the step S95 and the step S97.

Figure 25:
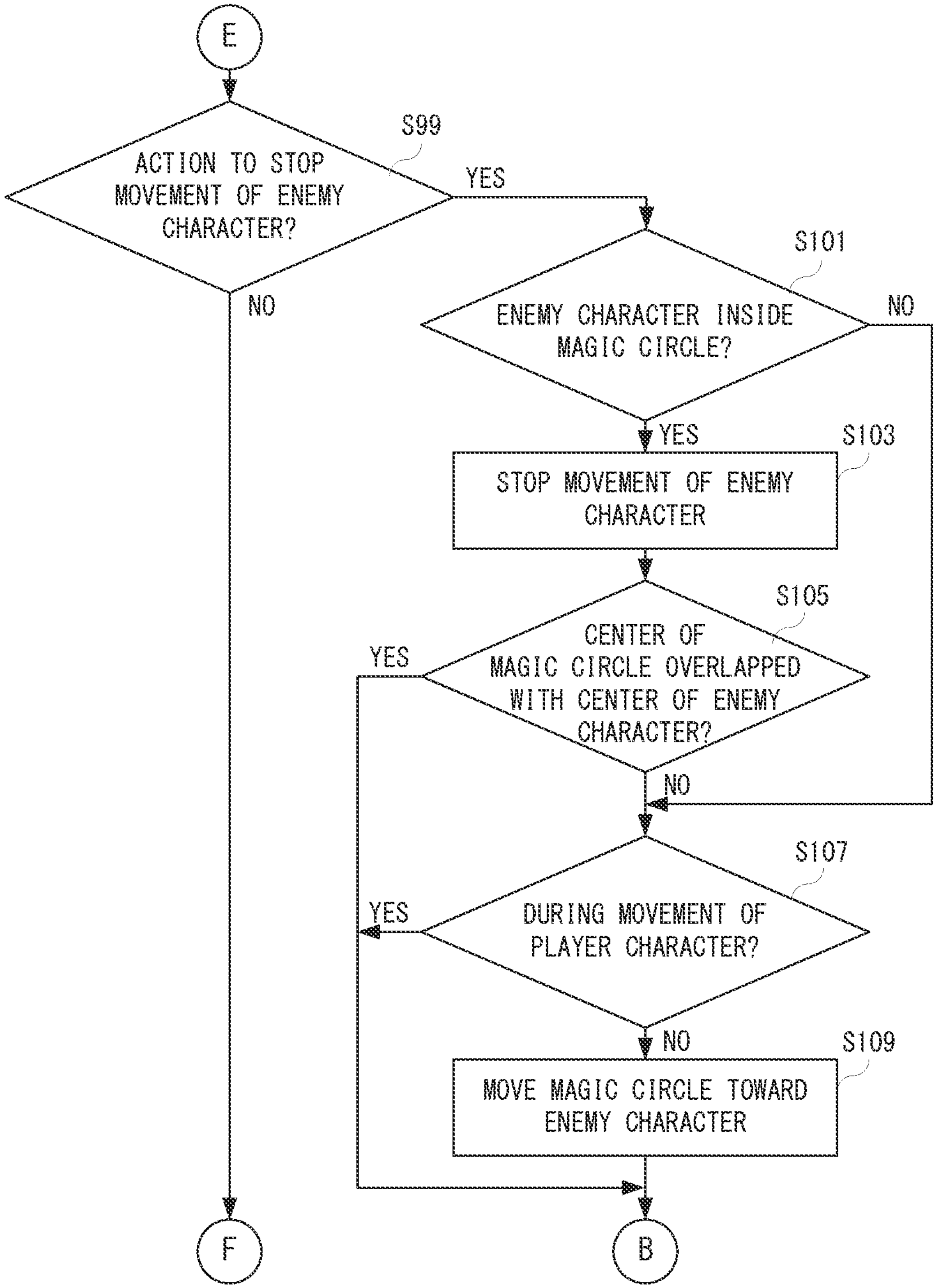
FIG. 25 is a flowchart showing a fifth part of the non-limiting example game control processing of the processor (s) of the main body apparatus shown in FIG. 6, following FIG. 24.

Moreover, if "NO" is determined in the step S91, that is, if an attack is not to be performed, it is determined, in a step S99 shown in FIG. 25, whether an action stopping a movement of the enemy character 208 is to be performed. Here, the processor 81 determines whether the operation data acquired in the step S3 includes the operation data indicating an operation of the ZL button 39.

If "NO" is determined in the step S99, that is, if an action stopping a movement of the enemy character 208 is not to be performed, the process proceeds to a step S111. On the other hand, if "YES" is determined in the step S99, that is, if an action stopping a movement of the enemy character 208 is to be performed, it is determined, in a step S101, whether the enemy character 208 is within the magic circle 230.

If "NO" is determined in the step S101, that is, if the enemy character 208 is not within the magic circle 230, the process proceeds to a step S107. On the other hand, if "YES" is determined in the step S101, that is, if the enemy character 208 is within the magic circle 230, a movement of the enemy character 208 is topped in a step S103.

In a next step S105, it is determined whether the center of the magic circle 230 is overlapped with the position of the enemy character 208. If "YES" is determined in the step S105, that is, if the center of the magic circle 230 is overlapped with the position of the enemy character 208, the process proceeds to the step S127. On the other hand, if "NO" is determined in the step S105, that is, if the center of the magic circle 230 is not overlapped with the position of the enemy character 208, it is determined, in a step S107, whether the player character 202 is during moving.

If "YES" is determined in the step S107, that is, if the player character 202 is during moving, the process proceeds to the step S127. On the other hand, if "NO" is determined in the step S107, that is, if the player character 202 is not during moving, in a step S109, the magic circle 230 is made to be moved toward the position of the enemy character 208 to approach the enemy character 208 by a distance of one frame (e.g., few or several centimeters in the virtual space), and the process proceeds to the step S127.

Figure 26:
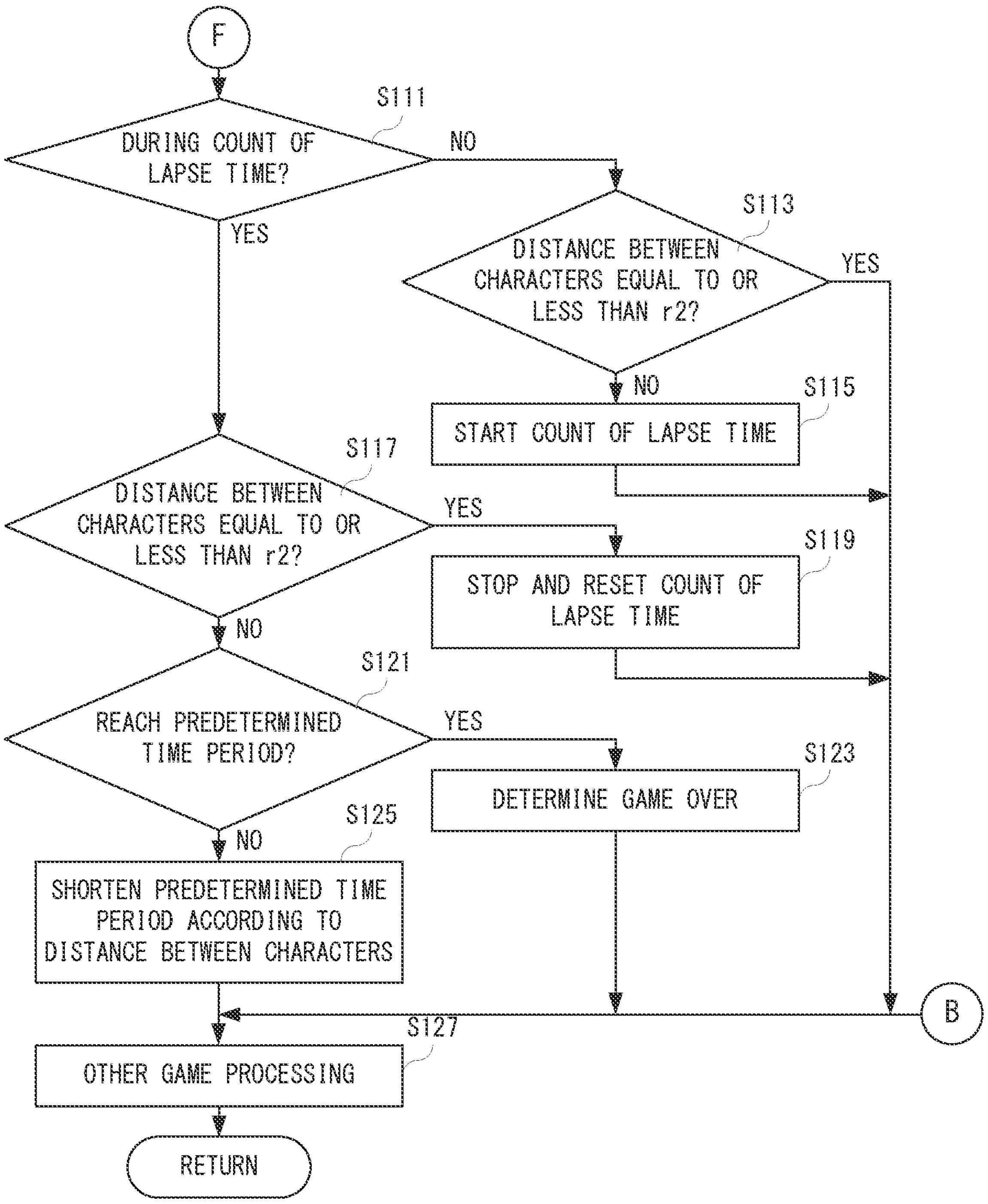
FIG. 26 is a flowchart showing a sixth part of the non-limiting example game control processing of the processor(s) of the main body apparatus shown in FIG. 6, following FIG. 24 and FIG. 25.

In a step S111 shown in FIG. 26, it is determined whether it is during counting a lapse time period. If "NO" is determined in the step S111, that is, if it is not during counting a lapse time period, it is determined, in a step S113, whether the distance between characters is equal to or less than the distance r2. If "YES" is determined in the step S113, that is, if the distance between characters is equal to or less than the distance r2, the process proceeds to the step S127. On the other hand, if "NO" is determined in the step S113, that is, if the distance between characters exceeds the distance r2, the count of the lapse time period is started in a step S115, and the process proceeds to the step S127. In the step S115, the processor 81 starts the timer 854f.

Moreover, if "YES" is determined in the step S111, that is, if it is during counting a lapse time period, it is determined, in a step S117, whether the distance between characters is equal to or less than the distance r2. If "YES" is determined in the step S117, the count of the lapse time period is stopped and reset in a step S119, and the process proceeds to the step S127. On the other hand, if "NO" is determined in the step S117, it is determined, in a step S121, whether the lapse time period reaches a predetermined time period.

If "YES" is determined in the step S121, that is, if the lapse time period reaches a predetermined time period, the game over is determined in a step S123, and the process proceeds to the step S127. On the other hand, if "NO" is determined in the step S121, that is, if the lapse time does not reach the predetermined time period, a predetermined time period is shortened according to the distance between characters in a step S125, and the process proceeds to the step S127. In the step S125, as the distance between characters becomes longer, that is, according to one second being counted, an amount of the scale that is to be shortened is increased. However, when the distance between characters is not made to be longer, the predetermined period is not shortened.

In the step S127, other game processing is executed and the game control processing is terminated, and then, the process is returned to the overall processing shown in FIG. 20. In the step S127, the processor 81 executes the game processing of moving the enemy character 208, making the enemy character 208 attack the player character 202 or the fellow character (204 or 206), or making an item appear, etc. However, when the movement of the enemy character 208 is being stopped by the player character 202, the enemy character 208 is not moved. Moreover, in the step S127, the processor 81 determines the game clear or the game over. However, in the step S127, when the player character 202 receives the attack of the enemy character 208, it is determined whether it is the game over.

According to the embodiment, since the player character and the first fellow character are moved individually or the player character and the second fellow character are moved together, as compared with a case where two characters are always moved individually, it is possible to suppress a sense of burden of the player.

Moreover, according to the embodiment, since the L button that is provided on the left controller with the left side analog stick that bears a movement operation in the combined state functions as a control portion of a change operation to the combined state from the separated state, the player can perform the changing operation with the left hand and then use the same left controller to perform the movement operation, and therefore, there is little possibility that the player is confused in the operation. Inversely, when changing to the separated state from the combined state, a movement operation of the first fellow character is performed by the right side analog stick that is provided on the right controller, and the R button on the same right side bears the function of the change operation to the separated state, and therefore, similarly, confusion is not caused in changing the operation state and subsequent operations.

Figure 27A:
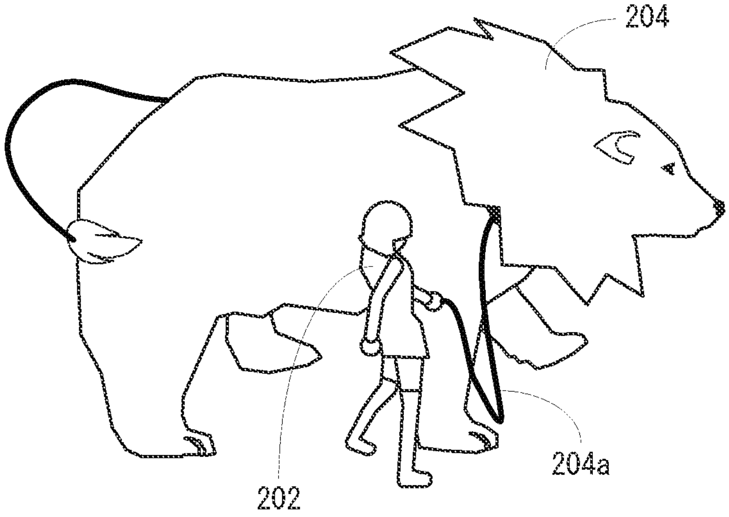
FIG. 27A is a view showing another non-limiting example combined state of the player character and the fellow character.
Figure 27B:
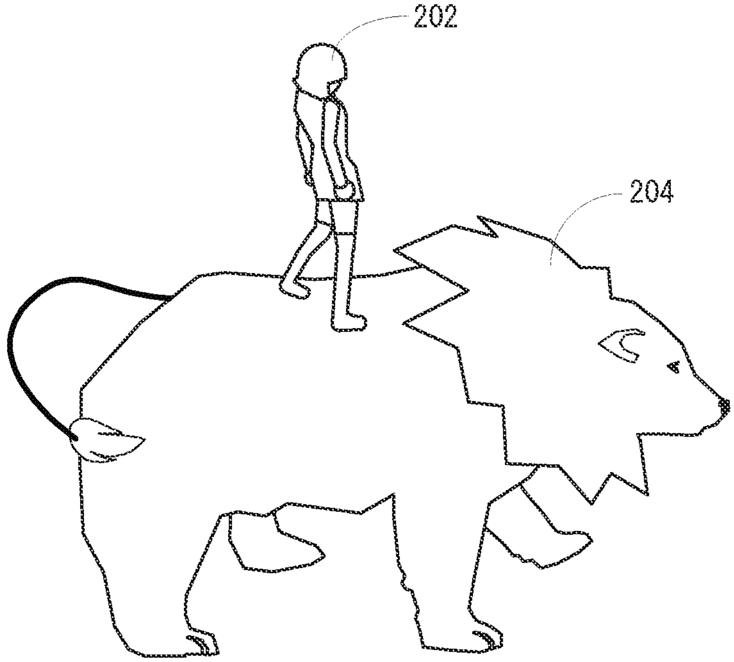
FIG. 27B is a view showing a further non-limiting example combined state of the player character and the fellow character.

In addition, in the above-described embodiment, as an example of a case where the player character and the second fellow character are combined with each other, the first fellow character is deformed and the second fellow character is held by the player character in arms, but it does not need to be limited to this. The first fellow character may be combined with the player character by being absorbed inside the body of the player character. Moreover, as shown in FIG. 27A, in another example of the combined state, the first fellow character 204 without being deformed is combined with the player character 202 by making the player character 202 hold a rope 204*a* extended from a collar that is attached to the first fellow character 204, and the player character 202 and the first fellow character 204 may be moved together. Moreover, as shown in FIG. 27B, in a further example of the combined state, the first fellow character 204 without being deformed is combined with the player character 202 by making the player character 202 ride on the first fellow character 204, and the player character 202 and the first fellow character 204 may be moved together. Although the player character 202 stands on the first fellow character 204 in FIG. 27B, the player character 202 may straddle on the first fellow character 204. Even in the combined state as shown in FIG. 27A or FIG. 27B, the player character 202 is overlapped, contacted or coupled with the second player character such as a fellow character.

Moreover, although the second fellow character is held by the player character in arms in the combined state in the above-described embodiment, should not be limited. The second fellow character may serve as a weapon or a protector, and may be equipped to the hand of the player character.

Furthermore, in the above-described embodiment, in the combined state, when the right side analog stick provided on the right controller is tilted, the second fellow character elongates the body in the tilted direction of the analog stick, but should not be limited. The player character may elongate the hand or arm instead of or in addition to the second fellow character elongates the body. Alternatively, the player character or the second fellow character may emit an aura in the direction that the right side analog stick provided on the right controller is tilted.

Moreover, in the above-described embodiment, in the separated state, the player character is moved by the left side analog stick provided on the left controller and the first fellow character is moved by the right side analog stick provided on the right controller, and in the combined state, the second fellow character is moved along with the player character by the left side analog stick. This is because it is generally known that the player character is moved with the left side analog stick. However, it is possible to modify to a manner that in the separated state, the player character is moved by the right side analog stick and the first fellow character is moved by the left side analog stick, and in the combined state, the second fellow character is moved by the right side analog stick together the player character. In this case, the functions assigned to the left side operation buttons 33-36, 38 and 39 and the functions assigned to the right side operation buttons 53-56, 60 and 61 may be replaced with each other.

Moreover, although the above-described embodiment is described for a case where the fellow character combined with or separated from the player character, it does not need to be limited to this. No deformation between the first fellow character and the second fellow character is needed, they may be individual fellow characters, respectively. As an example, the operation state is changeable between the separated state and the combined state, and in the separated state, the first fellow character appears in the virtual space as a fellow character of the player character, and in the combined state, the second fellow character appears in the virtual space as a fellow character of the player character.

Furthermore, in the embodiment, if the L button 38 is operated in a case where the distance between characters is equal to or less than the distance r1, the operation state is changed from the separated state to the combined state; however, it is possible to modify to a manner that even if the distance between characters is equal to or less than the distance r1, when satisfying a predetermined condition, the operation state cannot be changed to the combined state. As the predetermined condition, a case where the player character is in an area into which the first fellow character cannot enter, and cases where the first fellow character is being attacked or becomes in an abnormal state, etc. correspond.

Furthermore, in the above-described embodiment, when the time period that the distance between characters of the player character and the first fellow character exceeds the distance r2 exceeds the predetermined time period, the game over is determined, but should not be limited. The game over may be determined when the time period that the player character or the first fellow character has come out of the game screen (i.e., an angle of view of a virtual camera) exceeds a predetermined time period.

Furthermore, although the player character, etc. are operated using the analog stick that the stick is tilted in the above-described embodiment, an operation device such as a slide pad that a stick is slid may be used.

In addition, although the game system 1 is shown as an example of a game system in the above-described embodiment, its configuration should not be limited, and other configurations may be adopted. For example, in the above-described embodiment, the above-described "computer" is a single computer (specifically, the processor 81), but it may be a plurality of computers in other embodiments. The above-described "computer" may be a plurality of computers provided in a plurality of apparatuses, for example, and more specifically, the above-described "computer" may be constituted by the processor 81 of the main body apparatus 2 and the communication control sections (microprocessor) 101 and 111 provided on the controllers.

Moreover, although a case where the game image is displayed on the display 12 is described in the above-described embodiment, it does not need to be limited to this. The game image can be displayed also on a stationary monitor (e.g., television monitor) by connecting the main body apparatus 2 to the stationary monitor via a cradle. In such a case, it is possible to constitute a game system including the game system 1 and the stationary monitor.

Furthermore, although the above-described embodiment are described on a case where the game system 1 having structure that the left controller 3 and the right controller 4 are attachable to or detachable from the main body apparatus 2 is used, it does not need to be limited to this. For example, it is possible to use a game apparatus including the main body apparatus 2 integrally provided with an operation portion having operation buttons and analog sticks similar to those of the left controller 3 and the right controller 4, or a game apparatus such as further electronic equipment capable of executing a game program. The further electronic equipment corresponds to smartphones, tablet PCs or the like. In such a case, an operation portion may constitute with software keys.

Furthermore, specific numeral values and images shown in the above-described embodiment are mere examples and can be appropriately changed according to actual products.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A non-transitory computer-readable storage medium having stored with a game program executable by an information processing apparatus comprising one or more processors, wherein the information processing apparatus is communicable with an operation device having a plurality of operation portions including a one-side direction input portion provided on a one-side holding portion that is held by one hand of a player, an other-side direction input portion provided on an other-side holding portion that is held by another hand of the player, a first one-side operation portion provided on the one-side holding portion and a first other-side operation portion provided on the other-side holding portion, wherein the game program is configured to cause the one or more processors to execute at least:

acquiring operation data that indicates an operation with respect to the plurality of operation portions;

during a time of a first mode, controlling a movement of a first player character in a virtual space according to an operation direction of the one-side direction input portion indicated by the operation data and controlling a movement of a second player character in the virtual space according to an operation direction of the other-side direction input portion;

during a time of a second mode, controlling at least the movement of the first player character in the virtual space based on the operation direction of the one-side direction input portion indicated by the operation data; changing to the second mode from the first mode according to an operation of the first one-side operation portion indicated by the operation data;

making the second player character disappear from its position in the first mode when changing to the second mode;

changing to the first mode from the second mode according to an operation of the first other-side operation portion indicated by the operation data; and arranging the second player character at a position based on a position of the first player character when changing to the first mode.

2. The storage medium according to claim 1, wherein the game program is further configured to cause the one or more processors to execute at least:

determining whether a distance between characters that is a distance between first player character and the second player character in the virtual space exceeds a predetermined distance; and determining that a virtual game is in failure when the distance between characters exceeds the predetermined distance.

3. The storage medium according to claim 2, wherein the game program is further configured to cause the one or more processors to execute at least:

determining that the virtual game is in failure when a time period that the distance between characters exceeds the predetermined distance is continued for a predetermined time period; and shortening the predetermined time period in a case where at least one of the first player character and the second player character is moved in a direction that the distance between characters becomes longer in a state that the distance between characters exceeds the predetermined distance in comparison with a case where at least one of the first player character and the second player character is not moved in the direction that the distance between characters becomes longer.

4. The storage medium according to claim 1, wherein the game program is further configured to cause the one or more processors to execute at least:

combining the second player character with the first player character when changing to the second mode from the first mode; and performing, according to an operation of the other-side direction input portion, a predetermined action having an effect toward a direction that the other-side direction input portion from the position based on the position of the first player character is operated.

5. The storage medium according to claim 4, wherein the game program is further configured to cause the one or more processors to execute at least: performing continuously the predetermined action while the other-side direction input portion is continued to be operated.

6. The storage medium according to claim 4, wherein the other-side direction input portion of the operation device includes a stick or a slide pad, wherein the game program is further configured to cause the one or more processors to execute at least: performing, irrespective of an amount that the other-side direction input portion is tilted or slid, the predetermined action in a position away from the first player character by a predetermined length or between the first player character and the position away from the first player character.

7. The storage medium according to claim 4, wherein the game program is further configured to cause the one or more processors to execute at least:

combining the second player character with the first player character when changing to the second mode from the first mode; and elongating the second player character in a direction that the other-side direction input portion is operated from the first player character according to an operation of the other-side direction input portion.

8. The storage medium according to claim 6, wherein the game program is further configured to cause the one or more processors to execute at least: deforming and combining the second player character with the first player character when changing to the second mode from the first mode.

9. The storage medium according to claim 1, wherein the plurality of operation portions include a second one-side operation portion that is provided on the one-side holding portion and different from the first one-side operation portion and a second other-side operation portion that is provided on the other-side holding portion and different from the first other-side operation portion, wherein the game program is further configured to cause the one or more processors to execute at least:

making, according to an operation of the second one-side operation portion, the first player character perform an action to stop a movement of an enemy character; and making, according to an operation of the second other-side operation portion, the second player character perform an action to attack the enemy character.

10. The storage medium according to claim 9, wherein the game program is further configured to cause the one or more processors to execute at least:

making, according to an operation of the second one-side operation portion, the first player character perform the action to stop a movement of the enemy character when the enemy character exists within a first effective range that is set based on the position of the first player character; and making, according to an operation of the second other-side operation portion, the second player character perform the action to attack the enemy character when the enemy character exists within a second effective range that is set based on the position of the second player character, the first effective range being wider that the second effective range.

11. The storage medium according to claim 9, wherein the game program is further configured to cause the one or more processors to execute at least:

moving an effective range that is set based on a position of the first player character toward a position of the enemy character when performing the action to stop a movement of the enemy character; and making, according to an operation of the second one-side operation portion, the first player character perform the action to stop the movement of the enemy character when the enemy character exists within the effective range.

12. The storage medium according to claim 1, wherein the plurality of operation portions include a second one-side operation portion that is different from the first one-side operation portion and provided on a surface different from a surface on which the one-side operation portion is provided, and a second other-side operation portion that is different from the first other-side operation portion and provided on a surface different from a surface on which the other-side operation portion is provided, wherein the game program is further configured to cause the one or more processors to execute at least:

further controlling a direction of the first player character based on an operation input of the one-side direction input portion and a direction of the second player character based on an operation input of the other-side direction input portion;

performing a first action having an effect in a direction that the first player character faces according to an operation of the second one-side operation portion; and performing a second action having an effect in a direction that the second player character faces according to an operation of the second other-side operation portion.

13. The storage medium according to claim 12, wherein the game program is further configured to cause the one or more processors to execute at least: performing, when the second other-side operation portion is operated, a third action that has an effect in a direction according to an operation direction of the other-side direction input portion, the third action being different from the first action and the second action.

14. The storage medium according to claim 12, wherein the plurality of operation portions include a third one-side operation portion provided on a surface of the one-side holding portion that is the same as a surface on which the one-side direction input portion is provided, and a third other-side operation portion provided on a surface of the other-side holding portion that is the same as a surface on which the other-side direction input portion is provided, wherein the game program is further configured to cause the one or more processors to execute at least:

performing, when the third one-side operation portion is operated, a fourth action having an effect that is irrespective of a direction that the first player character faces; and performing, when the third other-side operation portion is operated, a fifth action having an effect that is irrespective of a direction that the second player character faces.

15. The storage medium according to claim 12, wherein the first one-side operation portion is provided on a surface different from a surface on which the one-side direction input portion is provided, and the first other-side operation portion is provided on a surface different from a surface on which the other-side direction input portion is provided.

16. The storage medium according to claim 15, wherein the game program is further configured to cause the one or more processors to execute at least: making the second player character, according to an operation of the first other-side operation portion, perform a fourth action that is different from the second action and has an effect on a direction that one of the first player character and the second player character faces.

17. A game system comprising an information processing apparatus having one or more processors and a storage medium storing with a game program, wherein the information processing apparatus is communicable with an operation device having a plurality of operation portions including a one-side direction input portion provided on a one-side holding portion that is held by one hand of a player, an other-side direction input portion provided on an other-side holding portion that is held by another hand of the player, a first one-side operation portion provided on the one-side holding portion and a first other-side operation portion provided on the other-side holding portion, wherein the game program is configured to cause the one or more processors to execute at least:

acquiring operation data that indicates an operation with respect to the plurality of operation portions;

during a time of a first mode, controlling a movement of a first player character in a virtual space according to an operation direction of the one-side direction input portion indicated by the operation data and controlling a movement of a second player character in the virtual space according to an operation direction of the other-side direction input portion;

during a time of a second mode, controlling at least the movement of the first player character in the virtual space based on the operation direction of the one-side direction input portion indicated by the operation data; changing to the second mode from the first mode according to an operation of the first one-side operation portion indicated by the operation data;

making the second player character disappear from its position in the first mode when changing to the second mode;

changing to the first mode from the second mode according to an operation of the first other-side operation portion indicated by the operation data; and arranging the second player character at a position based on a position of the first player character when changing to the first mode.

18. The game system according to claim 17, wherein the plurality of operation portions include a second one-side operation portion that is different from the first one-side operation portion and provided on a surface of the one-side holding portion different from a surface on which the first one-side operation portion is provided, and a second other-side operation portion that is different from the first other-side operation portion and provided on a surface of the other-side holding portion different from a surface on which the first other-side operation portion is provided, wherein the game program is further configured to cause the one or more processors to execute at least:

further controlling a direction of the first player character based on an operation input of the one-side direction input portion and a direction of the second player character based on an operation input of the other-side direction input portion;

performing a first action having an effect in a direction that the first player character faces according to an operation of the second one-side operation portion; and performing a second action having an effect in a direction that the second player character faces according to an operation of the second other-side operation portion.

19. A game control method of an information processing apparatus comprising one or more processers, wherein the information processing apparatus is communicable with an operation device having a plurality of operation portions including a one-side direction input portion provided on a one-side holding portion that is held by one hand of a player, an other-side direction input portion provided on an other-side holding portion that is held by another hand of the player, a first one-side operation portion provided on the one-side holding portion and a first other-side operation portion provided on the other-side holding portion, the game control method comprising:

acquiring operation data that indicates an operation with respect to the plurality of operation portions;

during a time of a first mode, controlling a movement of a first player character in a virtual space according to an operation direction of the one-side direction input portion indicated by the operation data and controlling a movement of a second player character in the virtual space according to an operation direction of the other-side direction input portion;

during a time of a second mode, controlling at least the movement of the first player character in the virtual space based on the operation direction of the one-side direction input portion indicated by the operation data;

changing to the second mode from the first mode according to an operation of the first one-side operation portion indicated by the operation data;

making the second player character disappear from its position in the first mode when changing to the second mode;

changing to the first mode from the second mode according to an operation of the first other-side operation portion indicated by the operation data; and arranging the second player character at a position based on a position of the first player character when changing to the first mode.

20. The game control method according to claim 19, wherein the plurality of operation portions include a second one-side operation portion that is different from the first one-side operation portion and provided on a surface of the one-side holding portion different from a surface on which the first one-side operation portion is provided, and a second other-side operation portion that is different from the first other-side operation portion and provided on a surface of the other-side holding portion different from a surface on which the first other-side operation portion is provided, the game control method further comprising:

further controlling a direction of the first player character based on an operation input of the one-side direction input portion and a direction of the second player character based on an operation input of the other-side direction input portion;

performing a first action having an effect in a direction that the first player character faces according to an operation of the second one-side operation portion; and performing a second action having an effect in a direction that the second player character faces according to an operation of the second other-side operation portion.

* * * * *